(12) United States Patent
Fielder

(10) Patent No.: US 8,934,625 B2
(45) Date of Patent: Jan. 13, 2015

(54) METHOD AND SYSTEM FOR SECURING COMMUNICATION

(75) Inventor: Guy Fielder, Austin, TX (US)

(73) Assignee: PACid Technologies, LLC, Austin, TX (US)

( * ) Notice: Subject to any disclaimer, the term of this patent is extended or adjusted under 35 U.S.C. 154(b) by 676 days.

(21) Appl. No.: 12/731,523

(22) Filed: Mar. 25, 2010

(65) Prior Publication Data

US 2010/0299529 A1    Nov. 25, 2010

Related U.S. Application Data

(60) Provisional application No. 61/163,415, filed on Mar. 25, 2009.

(51) Int. Cl.
| H04L 9/12 | (2006.01) |
| H04L 9/08 | (2006.01) |
| H04L 9/06 | (2006.01) |
| G06F 21/60 | (2013.01) |

(Continued)

(52) U.S. Cl.
CPC .............. *H04L 9/12* (2013.01); *H04L 9/0838* (2013.01); *H04L 9/065* (2013.01); *G06F 21/602* (2013.01); *H04L 63/0428* (2013.01); *H04L 9/0869* (2013.01); *G06F 21/606* (2013.01); *H04L 9/0861* (2013.01); *H04L 9/16* (2013.01)
USPC ................................ 380/44; 380/42; 713/189

(58) Field of Classification Search
CPC ... G06F 21/602–21/606; H04L 9/065–9/0668; H04L 9/0816–9/0858; H04L 9/0861–9/0877; H04L 9/14–9/16; H04L 63/0428–63/0492; H04L 63/06–63/068

USPC ........... 380/42–43, 44–47; 713/150, 189–194
See application file for complete search history.

(56) References Cited

U.S. PATENT DOCUMENTS

| 4,613,901 A | 9/1986 | Gilhousen et al. |
| 4,649,233 A | 3/1987 | Bass et al. |
| 4,720,860 A | 1/1988 | Weiss |

(Continued)

FOREIGN PATENT DOCUMENTS

| EP | 1304848 A2 | 4/2003 |
| EP | 1478156 A2 | 11/2004 |

(Continued)

OTHER PUBLICATIONS

International Search Report and The Written Opinion issued in PCT/US2010/028583; Dated: Jul. 6, 2010; (14 pages).

(Continued)

*Primary Examiner* — Andrew Goldberg
*Assistant Examiner* — Kevin Bechtel
(74) *Attorney, Agent, or Firm* — Osha · Liang LLP

(57) ABSTRACT

A method for securing communication between members. The method includes a first member obtaining a secret. An n-bit generator executing on the first member generates a message digest using the first secret. The first member extracts algorithm selector bits and an encryption key from the message digest, and selects an encryption algorithm identified by the algorithm selector bits. The method further includes the first member encrypting a communication using the encryption algorithm and the encryption key to obtain an encrypted communication, and the first member sending, to a second member of the group, the first encrypted communication.

24 Claims, 10 Drawing Sheets

(51) Int. Cl.
*H04L 29/06* (2006.01)
*H04L 9/16* (2006.01)

(56) References Cited

U.S. PATENT DOCUMENTS

| | | | |
|---|---|---|---|
| 4,864,615 | A | 9/1989 | Bennett et al. |
| 4,924,515 | A | 5/1990 | Matyas et al. |
| 4,937,866 | A | 6/1990 | Crowther et al. |
| 5,020,105 | A | 5/1991 | Rosen et al. |
| 5,060,263 | A | 10/1991 | Bosen et al. |
| 5,065,429 | A | 11/1991 | Lang |
| 5,068,894 | A | 11/1991 | Hoppe |
| 5,153,919 | A | 10/1992 | Reeds, III et al. |
| 5,233,655 | A | 8/1993 | Shapiro |
| 5,237,610 | A | 8/1993 | Gammie et al. |
| 5,241,598 | A | 8/1993 | Raith |
| 5,309,516 | A | 5/1994 | Takaragi et al. |
| 5,355,413 | A | 10/1994 | Ohno |
| 5,361,062 | A | 11/1994 | Weiss et al. |
| 5,367,572 | A | 11/1994 | Weiss |
| 5,475,758 | A | 12/1995 | Kikuchi |
| 5,475,826 | A | 12/1995 | Fischer |
| 5,481,611 | A | 1/1996 | Owens et al. |
| 5,495,533 | A | 2/1996 | Linehan et al. |
| 5,638,448 | A | 6/1997 | Nguyen |
| 5,757,924 | A | 5/1998 | Friedman et al. |
| 5,796,830 | A | 8/1998 | Johnson et al. |
| 5,953,420 | A | 9/1999 | Matyas, Jr. et al. |
| 5,963,646 | A | 10/1999 | Fielder et al. |
| 5,963,696 | A | 10/1999 | Yoshida et al. |
| 5,966,441 | A | 10/1999 | Calamera |
| 5,974,550 | A | 10/1999 | Maliszewski |
| 5,995,624 | A | 11/1999 | Fielder et al. |
| 6,049,612 | A * | 4/2000 | Fielder et al. ............... 380/44 |
| 6,105,133 | A * | 8/2000 | Fielder et al. ............... 713/169 |
| 6,345,101 | B1 | 2/2002 | Shukla |
| 6,490,353 | B1 * | 12/2002 | Tan ............................. 380/37 |
| 6,587,563 | B1 | 7/2003 | Crandall |
| 6,769,060 | B1 | 7/2004 | Dent et al. |
| 6,947,556 | B1 | 9/2005 | Matyas, Jr. et al. |
| 6,987,853 | B2 | 1/2006 | Uner |
| 7,032,240 | B1 | 4/2006 | Cronce et al. |
| 7,095,855 | B1 | 8/2006 | Collins |
| 2002/0143872 | A1 | 10/2002 | Weiss et al. |
| 2002/0191796 | A1 | 12/2002 | Muschenborn |
| 2004/0025028 | A1 | 2/2004 | Takeuchi |
| 2004/0179684 | A1 | 9/2004 | Appenzeller et al. |
| 2004/0230800 | A1 | 11/2004 | Futa et al. |
| 2005/0039030 | A1 | 2/2005 | Rodgers et al. |
| 2005/0063352 | A1 | 3/2005 | Amara et al. |
| 2005/0076061 | A1 | 4/2005 | Cox |
| 2006/0112418 | A1 | 5/2006 | Bantz et al. |
| 2006/0174349 | A1 | 8/2006 | Cronce et al. |
| 2007/0255941 | A1 * | 11/2007 | Ellis ............................. 713/151 |
| 2007/0258584 | A1 | 11/2007 | Brown et al. |
| 2008/0065880 | A1 | 3/2008 | Martin |
| 2008/0244078 | A1 * | 10/2008 | Viljoen et al. ............... 709/229 |
| 2010/0070778 | A1 | 3/2010 | Murray |

FOREIGN PATENT DOCUMENTS

| | | |
|---|---|---|
| EP | 1906587 A2 | 4/2008 |
| GB | 2421407 A | 6/2006 |
| WO | 9847258 A2 | 10/1998 |
| WO | 03077469 A1 | 9/2003 |
| WO | 2004092864 A2 | 10/2004 |
| WO | 2007005909 A2 | 1/2007 |
| WO | 2008061848 A2 | 5/2008 |

OTHER PUBLICATIONS

International Search Report and The Written Opinion issued in PCT/US2010/028582; Dated: Jul. 30, 2010; (14 pages).
Yuill, J., Denning, D., Feer, F.; "Using Deception to Hide Things from Hackers: Processes, Principles, and Techniques", Journal of Information Warfare, (16 pages) 2006.
Schneider, B., "Security Pitfalls in Cryptography", Counterpane Systems, www.counterpane.com/publish.html, 1998, (11 pages).
Schneier, B., "Why Cryptography is Harder Than it Looks", Counterpane Systems, www.counterpane.com/publish.html, 1997, (8 pages).
Schneier, B., "Cryptographic Design Vulnerabilities", Counterpane Systems, www.counterpane.com/publish.html, Sep. 1998, (5 pages).
Bellare, Mihir and Rogaway, Phillip, Entity Authentication and Key Distribution (Aug. 1993).
Bird, R. et al, "The KryptoKnight Family of Light-Weight Protocols for Authentication and Key Distribution," IEEE/Acm Transactions on Networking, vol. 3, No. 1, pp. 31-41, IEEE Press, Piscataway, NJ, Feb. 1995.
Damgard, I.B., "A Design Principle for Hash Functions,", Springer-Verlag, New York, 1998.
Gong, L., "Using One-Way Functions for Authentication," ACM Sigcom Computer Communication Review, vol. 19, Issue 5, pp. 8-11, New York, 1989.
Krawczyk, H., "Skeme: A Versatile Secure Key Exchange Mechanism for Internet," Proceedings of the 1996 Sympoium on Network and Distributed System Security (SNDSS) '96, pp. 114-127, IEEE Computer Society, Washington, DC (1996).
Leighton, T. and Micali, Silvio, "Secret Key Agreement without Public-Key Cryptography," , Springer-Verlag, New York, 1998.
Matyas, S.M. & Meyer, C.H., "Generation, Distribution, and Installation of Cryptograpic Keys," 17 IBM Sys. J. 2 (1978).
Merkle, R., "One Way Hash functions and DES,", Springer-Verlag, New York, 1998.
Molva, Reflik et al., "KryptoKnight Authentication and Key Distibution System," Computer Security-ESORICS 92 (Nov. 23-25, 1992).
Menezes, Alfred J. et al., Handbook of Applied Cryptography, CRC Press, Oct. 16, 1996.
Preneel, B. and Paul Covan Oorshot, "MDx-MAC and Building Fast MACs from Hash Functions," Lecture Notes in Computer Science; vol. 963, Proceedings of the 15th Annual International Cryptology Conference on Advances in Cryptology, pp. 1-14, Springer-Verlag, London, UK (1995).
Schneier, Bruce, Applied Cryptography, Katherine Schowalter, 1996 (and first edition (1994) of same).
Freier, A. et al., "SSL Version 3.0," Netscape Communications Corporation, Dec. 1995.
RSA Laboratories, "PKCS #5: Password-Based Encryption Standard," version 1.5, Nov. 1993.
Rivest, R., "The MD5 Message-Digest Algorithm," IETF RFC 1321, Apr. 1992.
Berson, Thomas A. "Differential Cryptanalysis Mod 232 with Applications to MD5". EUROCRYPT. (1992).
Bert den Boer, Antoon Bosselaers. Collisions for the Compression Function of MD5. Berlin; London: Soringer. (1993).
Kelsey, John et al., "Passphrase FAQ," alt.security.pgp, Oct. 1993.
"Windows '95 Vulnerabilities" , US Department of Energy, Computer Incident Advisory Committee, available at http://ftp.cerias.purdue.edu/pub/lists/academic-firewalls/academic-firewalls.951224 (1995).
Carl Meyer and S.M. Matyas, Cryptography: A New Dimension in Computer Data Security (1982).
Hans Dobbertin, "Cryptanalysis of MD5 Compress", May 2, 1996.
Hans Dobbertin, "The Status of MD5 After a Recent Attack", RSA Laboratories; CryptoBytes 1996.
Ehrsam, W.F. et al., "A Cryptographic Key Management Scheme for Implementing the Data Encryption Standard", IBM Sys. J., vol. 17 No. 2, 1978.
Cheng, P. et al., "Modular Key Management Protocol (MKMP)", Nov. 28, 1994.
RSA Laboratories, "PKCS #5 v2.0: Password-Based Cryptography Standard", Mar. 25, 1999.
U.S. Department of Commerce, National Institute of Standards and Technology, "Secure Hash Standard", FIPS PUB 180-1, Apr. 17, 1995. (24 pages).
International Preliminary Report on Patentability and The Written Opinion issued in PCT/US2010/028562; Dated: Oct. 6, 2011; (15 pages).

(56) References Cited

OTHER PUBLICATIONS

International Preliminary Report on Patentability and The Written Opinion issued in PCT/US2010/028565 Dated: Oct. 6, 2011; (16 pages).
International Preliminary Report on Patentability and The Written Opinion issued in PCT/US2010/028582; Dated: Oct. 6, 2011; (8 pages).
International Preliminary Report on Patentability and The Written Opinion issued in PCT/US2010/02853; Dated: Oct. 6, 2011; (9 pages).
International Preliminary Report on Patentability and The Written Opinion issued in PCT/US2010/028566; Dated: Oct. 6, 2011; (7 pages).
International Search Report and The Written Opinion issued in PCT/US2010/028566; Dated: Dec. 30, 2010; (10 pages).
International Search Report and The Written Opinion issued in PCT/US2010/028565; Dated: Oct. 6, 2010; (24 pages).
International Search Report and The Written Opinion issued in PCT/US2010/028562; Dated: Sep. 29, 2010; (24 pages).
Barrett, Daniel and Sliverman, Richard, "SSH, The Secure Shell: The Definitive Guide, 2nd Edition", O'Reilly Media, Section 2.4, Section 3.3, Section 3.4, Section 6.1-6.7. May 1, 2005.
Brenno de Winter; "Gnu Privacy Guard (GnuPG) Mini Howto"; retrieved from the Internet: http://www.gnupg.org/documentation/howtos.en.html, version 0.1.4; Aug. 10, 2004 (14 pages).

\* cited by examiner

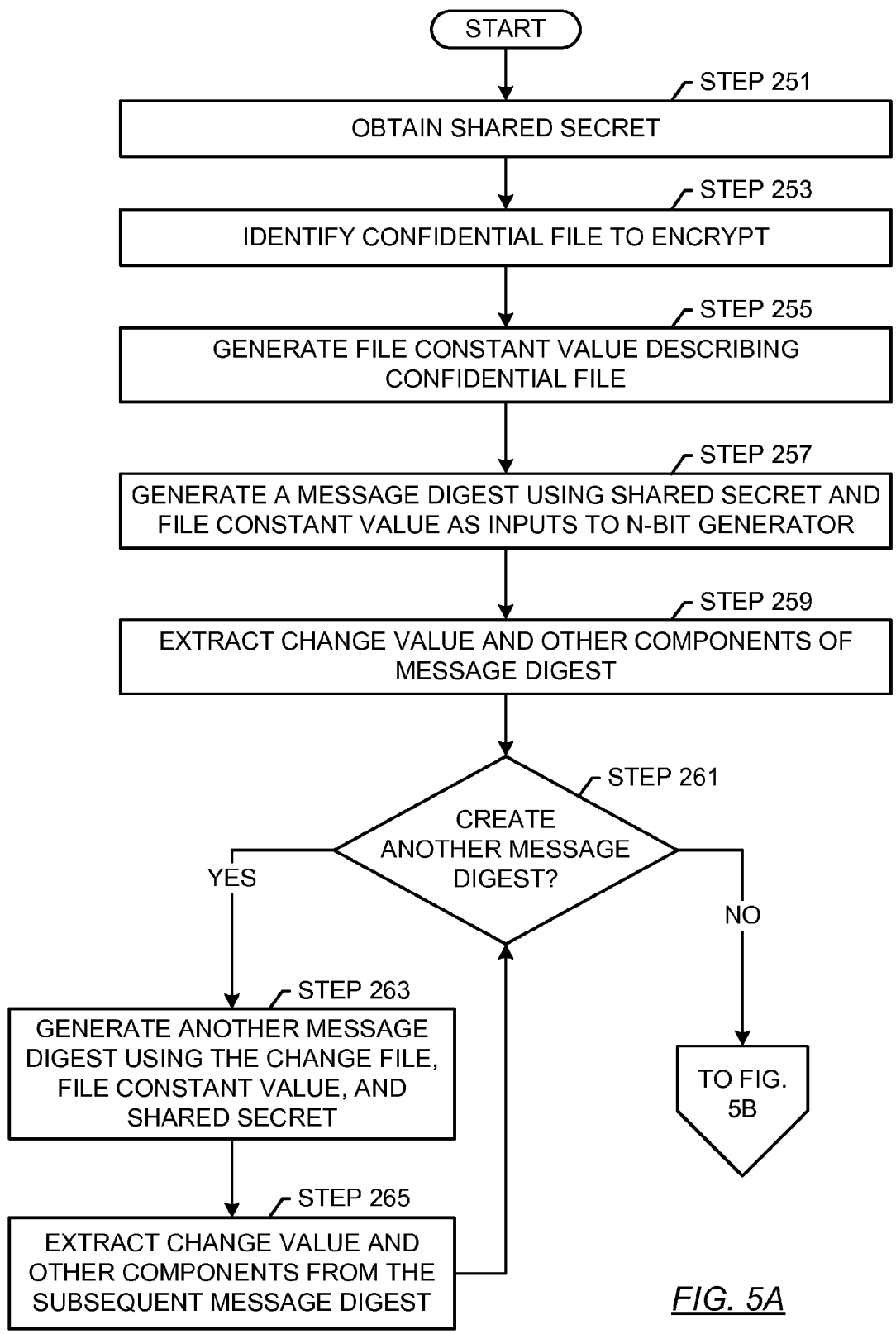

METHOD AND SYSTEM FOR SECURING COMMUNICATION

CROSS-REFERENCE TO RELATED APPLICATIONS

The present application claims benefit of U.S. Provisional Application No. 61/163,415 filed on Mar. 25, 2009 and entitled, "File Encryption Method and System Key and Algorithm Selector," and incorporated herein by reference.

BACKGROUND

The computer system assists in managing (e.g., storing, organizing, and communicating) a large amount of information. Some of the information managed by a computer system is confidential. In other words, access to such information is intended to be limited. Traditional protection schemes attempt to prevent unauthorized users from accessing the confidential information by requiring that a user provide authentication credentials, at a predefined entry point, to access an account that includes the confidential information. Protecting only the predefined entry points, however, fails to account for nefarious individuals creating other entry points by exploiting computer system vulnerabilities. For example, knowledge of a user's hardware and software system, system configuration, types of network connections, etc. may be used to create an entry point and gain access to the confidential information.

In order to prevent unauthorized access to the confidential information, the confidential information may be encrypted. Encryption is a process of transforming the clear text confidential information into an encrypted format that is unreadable by anyone or anything that does not possess a corresponding decryption key. An encryption algorithm and an encryption key are used to perform the transformation. Encryption technology is classified into two primary technology types: symmetric encryption technology and asymmetric encryption technology. Symmetric encryption technology uses the same encryption key to both encrypt and decrypt confidential information. Asymmetric encryption technology uses a pair of corresponding encryption keys: one encryption key to encrypt data and the other encryption key of the pair to decrypt the data.

SUMMARY

In general, in one aspect, the invention relates to a method for securing communication between members. The method includes a first member obtaining a secret. An n-bit generator executing on the first member generates a message digest using the first secret. The first member extracts algorithm selector bits and an encryption key from the message digest, and selects an encryption algorithm identified by the algorithm selector bits. The method further includes the first member encrypting a communication using the encryption algorithm and the encryption key to obtain an encrypted communication, and the first member sending, to a second member of the group, the first encrypted communication.

In general, in one aspect, the invention relates to a computing device. The computing device includes a processor, a memory, and software instructions stored in memory. The software instructions cause the processor to obtain a secret. An n-bit generator executing on the first member generates a message digest using the first secret. The first member extracts algorithm selector bits and an encryption key from the message digest, and selects an encryption algorithm identified by the algorithm selector bits. The software instructions cause the processor to encrypt a communication using the encryption algorithm and the encryption key to obtain an encrypted communication, and send, to a second member of the group, the first encrypted communication.

In general, in one aspect, the invention relates to a computer readable medium comprising computer readable program code embodied therein for causing a computer system to perform a method for securing communication between members. The method includes a first member obtaining a secret. An n-bit generator executing on the first member generates a message digest using the first secret. The first member extracts algorithm selector bits and an encryption key from the message digest, and selects an encryption algorithm identified by the algorithm selector bits. The method further includes the first member encrypting a communication using the encryption algorithm and the encryption key to obtain an encrypted communication, and the first member sending, to a second member of the group, the first encrypted communication.

Other aspects of the invention will be apparent from the following description and the appended claims.

BRIEF DESCRIPTION OF DRAWINGS

FIGS. 2-5B show flowcharts in accordance with one or more embodiments of the invention.

DETAILED DESCRIPTION

Figure 1A:
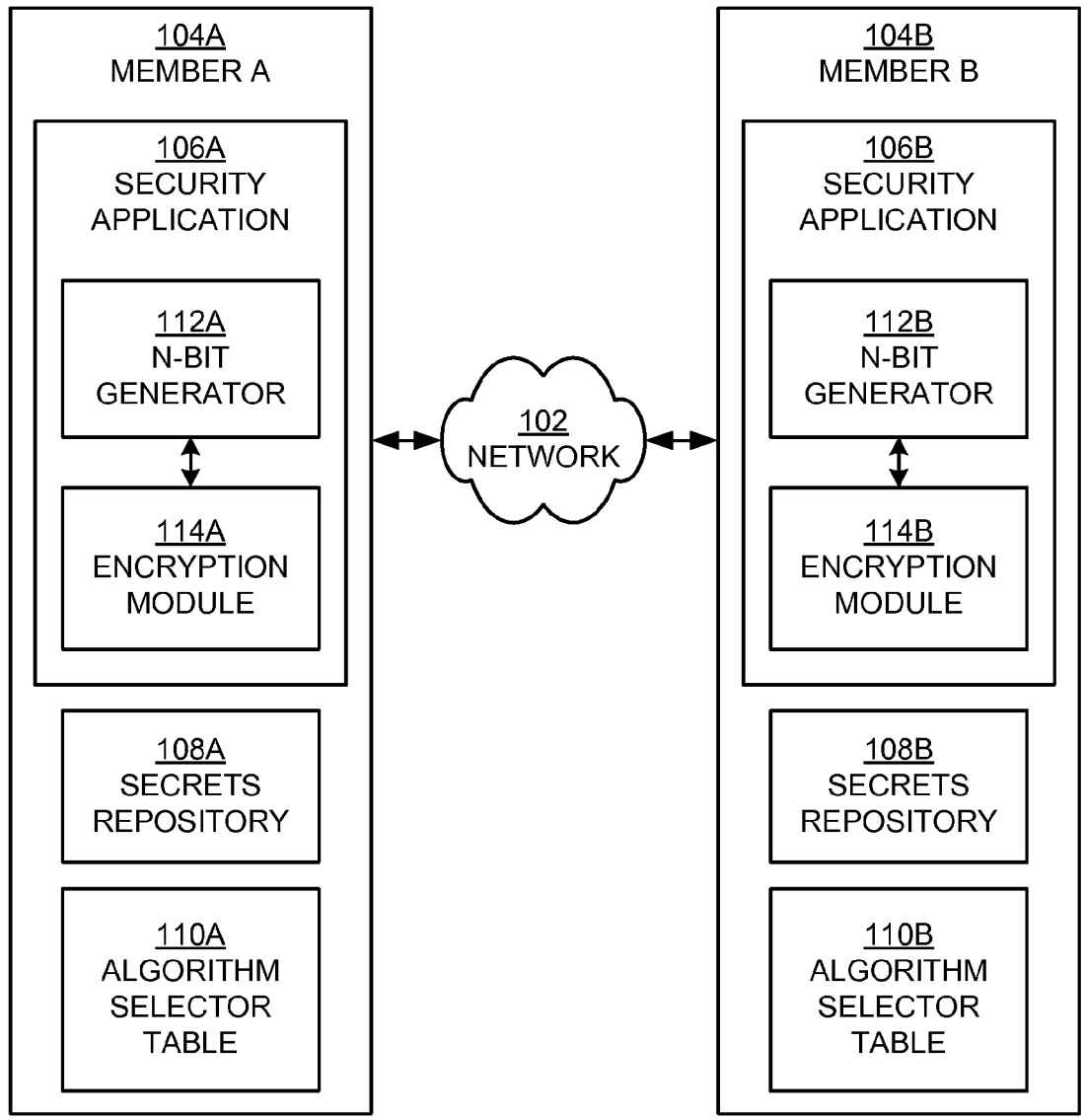
FIGS. 1A-1B show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to securing communication between members of a group, where each member is a computing device. In one or more embodiments of the invention, the group is two or more members that share (or intend to share) confidential information. The confidential information may be transmitted as communication (or portion thereof). Examples of communications include, but are not limited to, short messaging service (SMS) messages, electronic mail (e-mail), chat messages, audio message, graphics, audio-visual messages (e.g., video file, streaming video, etc.). Further, as used herein, a communication is encrypted when at least a portion of the communication is encrypted.

In one embodiment of the invention, a computing device is any physical or virtual device that may be used to perform embodiments of the invention. The physical device may correspond to any physical system with functionality to implement one or more embodiments of the invention. For example, the physical device may be implemented on a general purpose computing device (i.e., a device with a processor(s) and an operating system) such as, but not limited to, a desktop computer, a laptop computer, a gaming console, a mobile device (e.g., smart phone, a personal digital assistant, gaming device).

Alternatively, the physical device may be a special purpose computing device that includes an application-specific processor(s)/hardware configured to only execute embodiments of the invention. In such cases, the physical device may implement embodiments of the invention in hardware as a family of circuits and limited functionality to receive input and generate output in accordance with various embodiments of the invention. In addition, such computing devices may use a state-machine to implement various embodiments of the invention.

In another embodiment of the invention, the physical device may correspond to a computing device that include both a general purpose processor(s) and an application-specific processor(s)/hardware. In such cases, one or more portions of the invention may be implemented using the operating system and general purpose processor(s) and one or more portions of the invention may be implemented using the application-specific processor(s)/hardware.

The virtual device may correspond to a virtual machine. Broadly speaking, the virtual machines are distinct operating environments configured to inherit underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architectures involving: (i) one or more virtual machines executing on a host computer system such that each virtual machine serves as host to an instance of a guest operating system; and (ii) a hypervisor layer serving to facilitate intra-host communication between the one or more virtual machines and host computer system hardware. Alternatively, one or more embodiments of the invention may be implemented on Xen® architectures involving: (i) a control host operating system (e.g., Dom 0) including a hypervisor; and (ii) one or more VMs (e.g., Dom U) executing guest operating system instances. The invention is not limited to the aforementioned exemplary architectures. VMware® is a registered trademark of VMware, Inc. Xen® is a trademark overseen by the Xen Project Advisory Board.

Each of the members may be used by, for example, an individual, a business entity, a family, any other entity, or any combination thereof. For example, a group may have members John Smith's computing device and Jane Doe's computing device. As another example, a group may have members John Smith's smart phone, John Smith's personal computer, and John Smith's gaming console. As another example, a group may have members John Smith's computing device, Jane Smith's computing device, and the servers of the Smith's financial advisors. Other possible groups may exist without departing from the scope of the invention.

In one or more embodiments of the invention, an n-bit generator executing on a member of the group generates a message digest using a secret. The generated message digest includes algorithm selector bits and an encryption key. Accordingly, the first member extracts the algorithm selector bits and uses the extracted algorithm selector bits to select an encryption algorithm that is identified by the extracted algorithm selector bits. The member encrypts the communication using the selected algorithm and the encryption key extracted from the message digest. The member sends the communication to other member(s) of the group. The other members may decrypt the communication using a similar method as the member that created and sent the communication. As shown, the algorithm selector bits allow for changing of the encryption algorithm that is used by the members of the group. Specifically, not only may the encryption key change periodically, but the encryption algorithm may also change. Thus, a nefarious user or computer system may be unlikely to both identify the encryption algorithm and the encryption key for the correct communication.

Figure 1B:
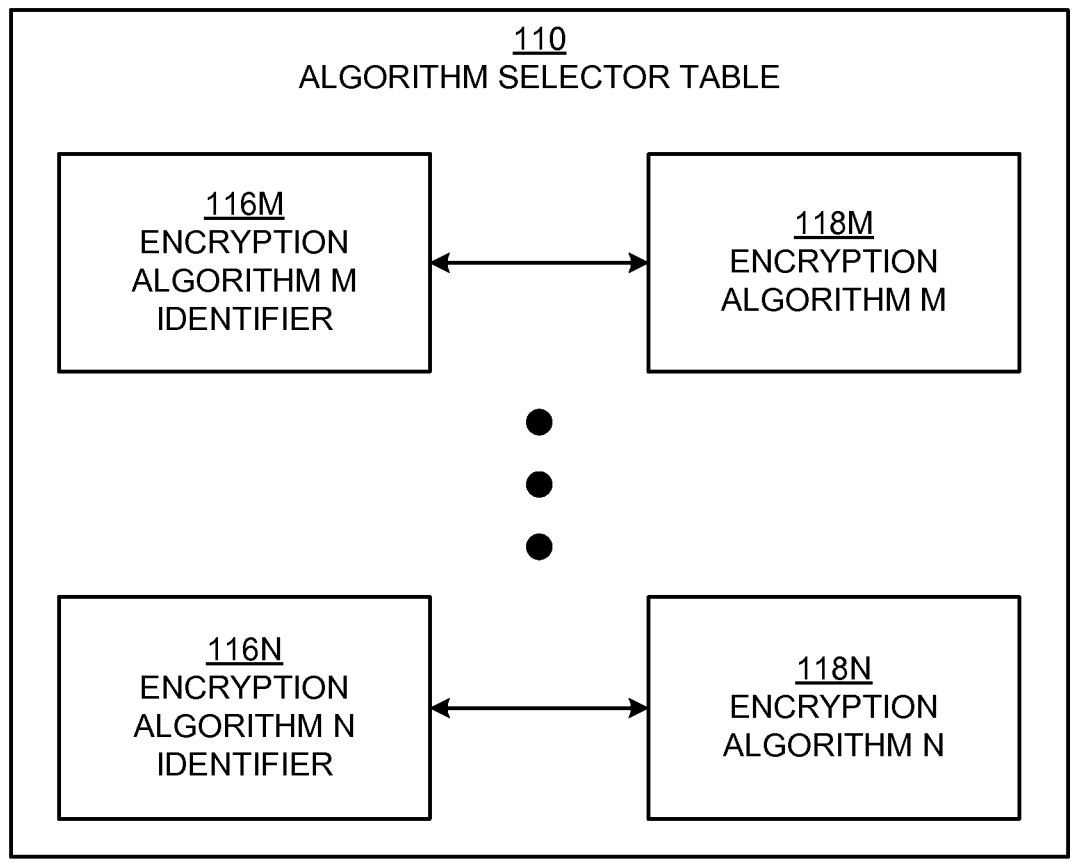

FIGS. 1A-1B show schematic diagrams in accordance with one or more embodiments of the invention. As shown in FIG. 1A, the system includes a network (102) and members (e.g., 104A, 104B). These components are described below.

In one or more embodiments of the invention, a network (102) is an interconnection of devices that allow for communication between any two devices within the network. For example, the network (102) may correspond to a local area network (LAN), a wide area network (WAN), such as the Internet, any other type of wired or wireless network, or combination thereof.

In one or more embodiments of the invention, each member (e.g., 104A, 104B) includes a security application (e.g., 106A, 106B), a secrets repository (e.g., 108A, 108B), and an algorithm selector table (110A, 110B). The security application (e.g., 106A, 106B) on each member (e.g., 104A, 104B) may be instances of the same application, different versions of the same application, or different applications. Further, the security application (e.g., 106A, 106B) may correspond to a complete program product or a programming module of another application. For example, the security application (e.g., 106A, 106B) may be a part of and provide security for a banking or commerce application. In one or more embodiments of the invention, the security application (e.g., 106A, 106B) includes an n-bit generator (e.g. 112A, 112B) and an encryption module (e.g. 114A, 114B). Each of the components of the security application (e.g. 106A, 106B) may be implemented in hardware, software, firmware, or a combination thereof. The components of the security application are discussed below.

In one or more embodiments of the invention, an n-bit generator (e.g., 112A, 112B) includes functionality to receive and process one or more inputs to generate a message digest. A message digest is a string of characters, which may be represented as a bit-string, in accordance with one or more embodiments of the invention. In one or more embodiments of the invention, the message digest is a bit string. Further, the n-bit generator includes functionality to generate a deterministic and repeatable message digest, which appears pseudo-random or random, in accordance with one or more embodiments of the invention. A pseudo-random output (e.g., message digest) is output that is repeatable and predictable but appears random. Specifically, in one or more embodiments of the invention, although the message digest is repeatable and calculable when the inputs and the operations performed by the n-bit generator (e.g., 112A, 112B) are known, the message digest appears random. The apparent randomness may be with respect to someone who knows or does not know the inputs in accordance with one or more embodiments of the invention. Alternatively, or additionally, the apparent randomness may be with respect to someone who does not know the operations performed by the n-bit generator in accordance with one or more embodiments of the invention. In one or more embodiments of the invention, the message digest is deterministic in that a single output exists for a given set of inputs. Moreover, the message digest may be a fixed length. In other words, regardless of the input length, the same n-bit generator (e.g., 112A, 112B) may produce a message digest with a fixed length.

The number of bits in the input to the n-bit generator may be different or the same as the number of bits in the output produced by the n-bit generator. For example, if the n-bit generator accepts n number of bits for input and produces m number of bits for output, m may be less than, equal to, or greater than n. Multiple iterations of the n-bit generator may be performed to construct an ever-increasing m-bit result that includes multiple message digests.

Further, the n-bit generator (e.g., 112A, 112B) includes functionality to generate a deterministic message digest. Specifically, the n-bit generator (e.g., 112A, 112B) has the following two properties. First, the n-bit generator (e.g., 112A, 112B) generates the same message digest when provided with the same input(s). Second, the n-bit generator generates, with a high probability, a different message digest when provided with different input(s). For example, a single bit change in the input may result in a significant change of the bits in the resulting message digest. In the example, the change may be fifty percent of the bits depending on the type of n-bit generator used. However, a greater percentage or less percentage of bits may change without departing from the scope of the invention.

The n-bit generator (e.g., 112A, 112B) may include multiple sub-routines, such as a bit shuffler (not shown) and a hash function (not shown). In one or more embodiments of the invention, the bit shuffler includes functionality to combine multiple inputs into a single output. Specifically, the bit shuffler applies a function to the bit level representation of inputs to generate a resulting set of output bits. The output of the bit shuffler may appear as a shuffling of bits in each of inputs and may or may not have the same ratio of 1's to 0's as the input. In one or more embodiments of the invention, the bit shuffling by the bit shuffler has a commutative property. In other words, the order that inputs are provided to the bit shuffler does not affect the output. For example, consider the scenario in which the inputs are input X, input Y, and input Z. Bit shuffling on input X, input Y, and input Z produces the same output as bit shuffling on input Y, input Z, and input X.

In one embodiment of the invention, the bit shuffler may correspond to any function or series of functions for combining inputs. For example, the bit shuffler may correspond to the XOR function, the multiplication function, an addition function, or another function that may be used to combine inputs. As another example, the security application with the bit shuffler may correspond to a function that orders the inputs and then uses a non-commutative function to generate an output. The bit shuffler may correspond to other mechanisms for combining multiple inputs without departing from the scope of the invention.

In one or more embodiments of the invention, a hash function is a function that includes functionality to receive an input and produce a pseudo-random output. In one or more embodiments of the invention, the hash function may include functionality to convert a variable length input into a fixed length output. For example, the hash function may correspond to GOST, HAVAL, MD2, MD4, MD5, PANAMA, SNEERU, a member of the RIPEMD family of hash functions, a member of the SHA family of hash functions, Tiger, Whirlpool, S-Box, P-Box, any other hash function, or any combination thereof.

Although the above description discusses the use of the bit shuffler prior to the hash function, in one or more embodiments of the invention, the hash function operations may be performed prior to the bit shuffler operations. For example, the hash function may be performed separately on each of the inputs to create hashed inputs. The hashed inputs may then be combined by the bit shuffler. Alternatively, the bit shuffler may be first performed on the inputs to create a single intermediate result before the intermediate result is provided to the hash function. The intermediate result may be stored to be used later to create subsequent message digests. For example, generating a second message digest may be performed by combining the change value with the intermediate result of generating the first message digest to create an interim dynamic secret, and using the interim dynamic secret to generate the second message digest.

In one or more embodiments of the invention, the n-bit generator (e.g., 112A, 112B) is operatively connected to an encryption module (e.g., 114A, 114B). The encryption module (e.g., 114A, 114B) includes functionality to manage the encryption and decryption of information for the member (e.g., 104A, 104B). For example, the encryption module may include functionality to receive information, request one or more message digests from the n-bit generator (e.g., 112A, 112B), extract an encryption key from the one or more message digests, and encrypt the information using the encryption key. Alternatively, or additionally, the encryption module (e.g., 114A, 114B) may include functionality to receive encrypted information, request one or more message digests from the n-bit generator (e.g., 112A, 112B), extract an encryption key from the one or more message digests, and decrypt the encrypted information using the encryption key.

In one or more embodiments of the invention, the encryption module (e.g., 114A, 114B) is identically configured across all members of a group to request the same number of message digests. The configuration may be based, for example, on the type of communication, the encryption algorithm, and/or the type of data to be extracted from the message digest.

The encryption module (e.g., 114A, 114B) implements one or more encryption algorithms. In one or more embodiments of the invention, the encryption algorithm includes functionality to transform information in a clear text format into an encrypted format that is unreadable by anyone or anything that does not possess a corresponding encryption key. For example, the encryption algorithm may correspond to Data Encryption Algorithm (DEA) specified in the Data Encryption Standard (DES), Triple DES, Advanced Encryption Standard (AES), FEAL, SKIPJACK, any other encryption algorithm, or any combination thereof. In one or more embodiments of the invention, the encryption module implements only symmetric encryption algorithm(s). The encryption module (e.g., 114A, 114B) includes functionality to select the encryption algorithm using the algorithm selector table (e.g., 110A, 110B) (discussed below).

Continuing with the security application (e.g., 106A, 106B), although not shown in FIG. 1A, the security application (e.g., 106A, 106B) may also include an interface. The interface includes functionality to connect to entities that are not a part of the security application (e.g., 106A, 106B). For example, the interface may correspond to an application programming interface (API) and/or a user interface. The security application may be configured to communicate with other applications executing on the same or different computing devices using the API. Thus, for example, the API of member A's security application (106A) may include functionality to communicate via the network with member B's security application (106B). As another example, the API may include functionality to receive an encrypted format of a file and provide a clear text format of the file to another application executing on member A (e.g., 104A). Conversely, the API may include functionality to receive, from another application on member A (106A), a clear text format of a file and provide an encrypted format of the file to another application executing on member A (106A) or member B (106B).

In one or more embodiments of the invention, the user interface includes functionality to communicate with a user of the member (e.g., 104A, 104B). Specifically, the user interface includes functionality to receive input from the user and/or provide information to the user. The user interface may include hardware and/or software components, such as information boxes, menu buttons, drop down boxes, input boxes, hardware lights, hardware buttons, and/or other user interface components.

Continuing with FIG. 1A, each of the members (e.g., 104A, 104B) may include a secrets repository (e.g., 108A, 108B). In one or more embodiments of the invention, the secrets repository (e.g., 108A, 108B) is any type of storage unit and/or device (e.g., a file system, file, collection of files, database, collection of tables, external data store (e.g., a USB drive, etc.) or any other storage mechanism) for storing secrets. Further, the secrets repository (e.g., 108A, 108B) may include multiple different storage units and/or devices.

Secrets in the secrets repository (e.g., 106A, 106B) correspond to data known only to the members of the group. Further, each member of the group may independently generate the secrets using an n-bit generator (e.g., 112A, 112B). Thus, the secrets may correspond to one or more message digests, or a portion thereof. Generating the secrets is discussed below and in FIGS. 2 and 3.

Secrets in the secrets repository (e.g., 106A, 106B) are each associated with a given group and may be further organized according to type of communication in accordance with one or more embodiments of the invention. For example, secrets used for encryption in a chat session may be different than secrets used for encryption in an email communication. Alternatively or additionally, the secrets may be organized based on the clear text file format of a file to be encrypted. For example, secrets used to encrypt portable document formatted (PDF) files may be different than secrets used to encrypt extensible markup language (XML) files.

In one or more embodiments of the invention, each secret is a shared secret. A shared secret is information known by all members of the group. A shared secret may include a static secret, a dynamic secret, or both a static and a dynamic secret. The static secret may remain unchanged throughout the lifetime of the group in accordance with one or more embodiments of the invention. For example, the static secret may be used to recover secure communications by providing a new set of secrets when the members of the group lose synchronization with regards to the dynamic secrets. In contrast, the dynamic secret may periodically change, such as at the end of each communication session or prior to beginning a communication session or at boundaries during a communication session.

In one or more embodiments of the invention, a communication session may be a set of related communications (e.g., related short messaging service messages (SMS), related emails, chat messages, or other related communications). Alternatively, or additionally, a communication session may correspond to a set of communications starting at a first time and having a duration of a pre-defined amount of time. The pre-defined amount of time may be defined, for example, according to the amount of time after the last communication is sent and/or received.

Continuing with the discussion of the member (e.g., 104A, 104B), each member (e.g., 104A, 104B) includes an algorithm selector table (e.g., 110A, 110B). FIG. 1B shows an example algorithm selector table (110) in accordance with one or more embodiments of the invention.

As shown in FIG. 1B, an algorithm selector table (110) is a logical association between an algorithm identifier (e.g., 116M, 116N) and a corresponding encryption algorithm (e.g., 118M, 118N) (discussed above). The algorithm identifier may be, for example, a numeric, binary, or another such value. In one or more embodiments of the invention, all algorithm identifiers in a range are present. For example, the algorithm identifier may be a range of integers (e.g., 0 . . . 15), a sequence of binary values (e.g., 000, 001, 010, . . . 111). Further, the same encryption algorithm (e.g., 118M, 118N) may be associated with multiple algorithm identifiers (e.g., 116M, 116N). For example, "0" may correspond to AES, "1" may correspond to Triple DES, "2" may correspond to FEAL, and "3" may correspond to Triple DES.

Further, in one or more embodiments of the invention, the association between the encryption algorithm identifiers (e.g., 116M, 116N) and the encryption algorithms (e.g., 118M, 118N) is not based on a pre-defined ordering of encryption algorithms (e.g., 118M, 118N). Specifically, the association may be randomly defined.

The use of the term, "table", is only to denote a logical representation, various implementations of the algorithm selector table may be used without departing from the scope of the invention. For example, the algorithm selector table may be implemented in computer instructions using a series of conditional statements. Specifically, when a conditional statement is satisfied, the code corresponding to the implementation of the encryption algorithm is executed. By way of another example, the algorithm selector table (110) may be implemented as a data structure that associates the consecutive encryption algorithm identifiers (e.g., 116M, 116N) with identifiers used by the security application for each of the encryption algorithms. The above are only a few examples of possible implementations for the algorithm selector table (110) and not intended to limit the scope of the invention.

Further, all members associate the same encryption algorithm identifiers (e.g., 116M, 116N) with the same corresponding encryption algorithms (e.g., 118M, 118N). For example, if one member associates "0" with AES, "1" with Triple DES, "2" with FEAL, and "3" with Triple DES, then the remaining members associates "0" with AES, "1" with Triple DES, "2" with FEAL, and "3" with Triple DES. Further, all members may or may not use the same implementation of the algorithm selector table (110).

In one or more embodiments of the invention, the algorithm selector table (110) includes separate entries for each encryption algorithm and key length pair. In one or more embodiments of the invention, the encryption module may identify the encryption algorithm from the algorithm selector table (110) and use the key length associated with the encryption algorithm to extract the appropriate number of bits for the encryption key. For example, an entry may exist for Blowfish with an encryption key length 256 bits and a separate entry may exist for Blowfish with an encryption key length of 384 bits. In the example, if the first entry is specified in the algorithm selector bits of the message digest (discussed below), then 256 bits are extracted from the message digest(s) for the encryption key. Alternatively, in the example, if the second entry is specified, then 384 bits are extracted from the message digest for the encryption key.

Further, each entry in the algorithm selector table (110) may include a starting bit value. The starting bit value may be used to identify a first secret to use in the secrets repository or a starting bit for the encryption key in the message digest.

Alternatively, although not shown in FIG. 1A-1B, the system may include a key length table. The key length table may specify an identifier with a corresponding encryption key length. Similar to the algorithm selector table (110), multiple different possible implementations of the key length table may be used without departing from the scope of the invention. Further, all members of the group have the associations between key length identifiers and key lengths, but may not have the same implementation of key length table. For example, "1" may be associated with "256 bits", 2 may be associated with "128 bits", etc.

In one or more embodiment of the invention, when a key length table is used, the algorithm selector table (110) may be used to specify the encryption algorithm, and the key length table may be used to specify the number of bits in the encryption key. Specifically, a key length field (discussed below) in the message digest may index the corresponding entry in the key length table. In one or more embodiments of the invention, if the specified encryption algorithm does not allow for variable key length, then the key length field in the message digest is ignored.

FIGS. 2-5B show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Figure 2:
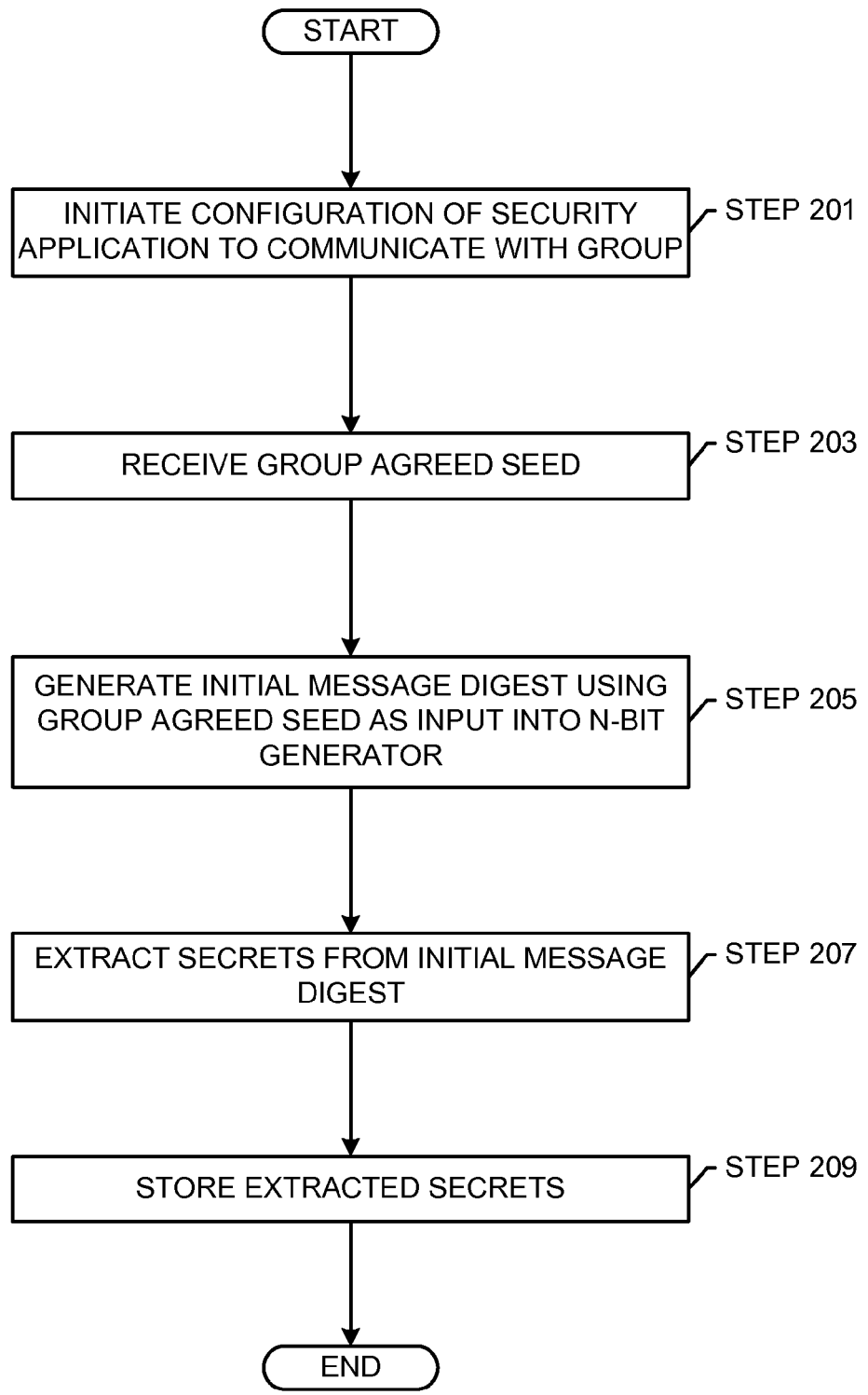

FIG. 2 shows a flowchart for creating an initial message digest using a group agreed seed in accordance with one or more embodiments of the invention. In Step 201, the configuration of the security application is initiated for communication with the group. In one or more embodiments of the invention, a user of a computing device may initiate the configuration of the security application by opening the security application, providing the user's credentials (e.g., user name and password and/or other authentication credentials), and submitting information about members of the group. For example, the information submitted may include each member's name, group nickname, contact information, and/or secure communication channel information for communicating with the member(s). Rather than a user initializing configuration of the security application, the security application may be remotely configured by another member of the group. For example, consider the scenario in which the group includes a bank computing device and a computing device of the user having an account at the bank. The member may be remotely initialized by the bank computing device. Alternatively, the computing device of the user may start the initialization of its security application and then turn control over to a bank computing device to complete the initialization, such as if the member is temporarily directly connected to the bank computing device. In such an initialization scenario, the member may be removed from the bank computing device and provided to a user for remote communication.

In Step 203, a group agreed seed is obtained. Specifically, the members of the group and/or their corresponding users communicate and agree on a group agreed seed. If the users communicate and agree on the group agreed seed, then the user may submit the group agreed seed to the security application. In such embodiments, the security application obtains the group agreed seed from the member. If the members communicate with the other members regarding the group agreed seed, then the member obtains the group agreed seed as the one agreed upon. The group agreed seed may be any password, passphrase, or series of characters. For example, the group agreed seed may be "the cow jumped over the moon," "#8$#DsaVA(@12w@," or any other collection of characters (e.g., symbols and/or alphanumeric characters). Users of the members (or a program executing on the members) may communicate the group agreed seed in person, over the phone, via postal mail, or using any other alternative communication channel. Each member may independently submit the group agreed seed to the security application. When prompted, the user of each member may enter the group agreed seed in a field of the user interface of the security application. Alternatively, a process executing on the member may provide the group agreed seed to the security application.

In Step 205, an initial message digest is generated using the group agreed seed as inputs to the n-bit generator. Specifically, the encryption module calls the instance of the n-bit generator in the security application using the group agreed seed as the input value.

In Step 207, secrets are extracted from the initial message digest. Specifically, the encryption module identifies each portion of the message digest relating to a secret. The following examples are not intended to limit the scope of the invention. Turning to an example, in a 512-bit message digest, bits in bit positions 0-127 may correspond to the static secret, bits in bit position corresponding to 128-383 may correspond to the dynamic secret and the final 128 bits may correspond to discard bits that remain unused and/or a change value used to generate subsequent message digests. In the example, the security application extracts the static secret by obtaining the first 128 bits of the message digest and extracts the dynamic secret by obtaining the next 256 bits. As discussed, the above is only an example. For example, the ordering of the static secrets, dynamic secret, and discard bits may be different from the previous example, the discard bits may be omitted, the static secret or a portion thereof may be in different message digests, the dynamic secret or a portion thereof may be in different message digests, or one of the secrets may be omitted. In one or more embodiments of the invention, each security application extracts the same bits for each of the secrets. Thus, each member of the group generates the same set of secrets.

As another example for extracting secrets, bits in the message digest may indicate the starting position of each of the secrets. For example, the first four bits low order or least significant of the message digest may be used as shift bits defining the start of a secret. In such an example, the first bit of a secret may start following the shift value. By way of an example, if the shift bits in the message digest are "0001" (or one in base 10), then the secret starts at bit position two. As another example, if the shift bits are "1000" (or eight in base 10), the secret starts a bit 9.

Additional secrets may be generated for the group by repeating Steps 205 and 207 using the initial message digest and subsequent message digests as an input to the n-bit generator. Alternatively, or additionally, Steps 205 and 207 may be repeated multiple times to generate new secrets. For example, each subsequent time may use, as input, the message digest from the previously time. Alternatively, or additionally, additional secrets may be generated by repeating Steps 203-205 in which new group agreed seeds are used.

In Step 209, the extracted secrets are stored in the secrets repository. In one or more embodiments of the invention, when the extracted secrets are stored, the extracted secrets are associated with the group. For example, extracted secrets for the same group may be stored in the file within the appropriate secrets repository. As another example, extracted secrets for the same group may be associated with a unique group identifier. Further, in one or more embodiments of the invention, the security application associates a secret identifier with each of the secrets. The secret identifier associated with the same secret is identical across all members of the group. For example, the secret identifier may be a sequential numeric identifier designating the order in which the particular secret(s) was generated in relation to other secrets. In the example, the first generated secrets may be associated with one, the second generated secrets may be associated with two, etc.

Additionally, the security applications for all members of the group may be configured to associate the same secrets with the same type of communications and/or the same types of applications. For example, the security applications may be configured to associate the first four generated secrets with email communications, the next six generated secrets with video conferencing applications, etc.

After storing the secrets in the secrets repository, the secrets may be used to create an encryption key for encrypting communications. Generating encryption keys for encrypting communications is discussed in FIGS. 3A and 3B below. Further, because all members of the group generate the same secrets, the resulting encryption keys are identical across all members of the group in accordance with one or more embodiments of the invention.

Figure 3:
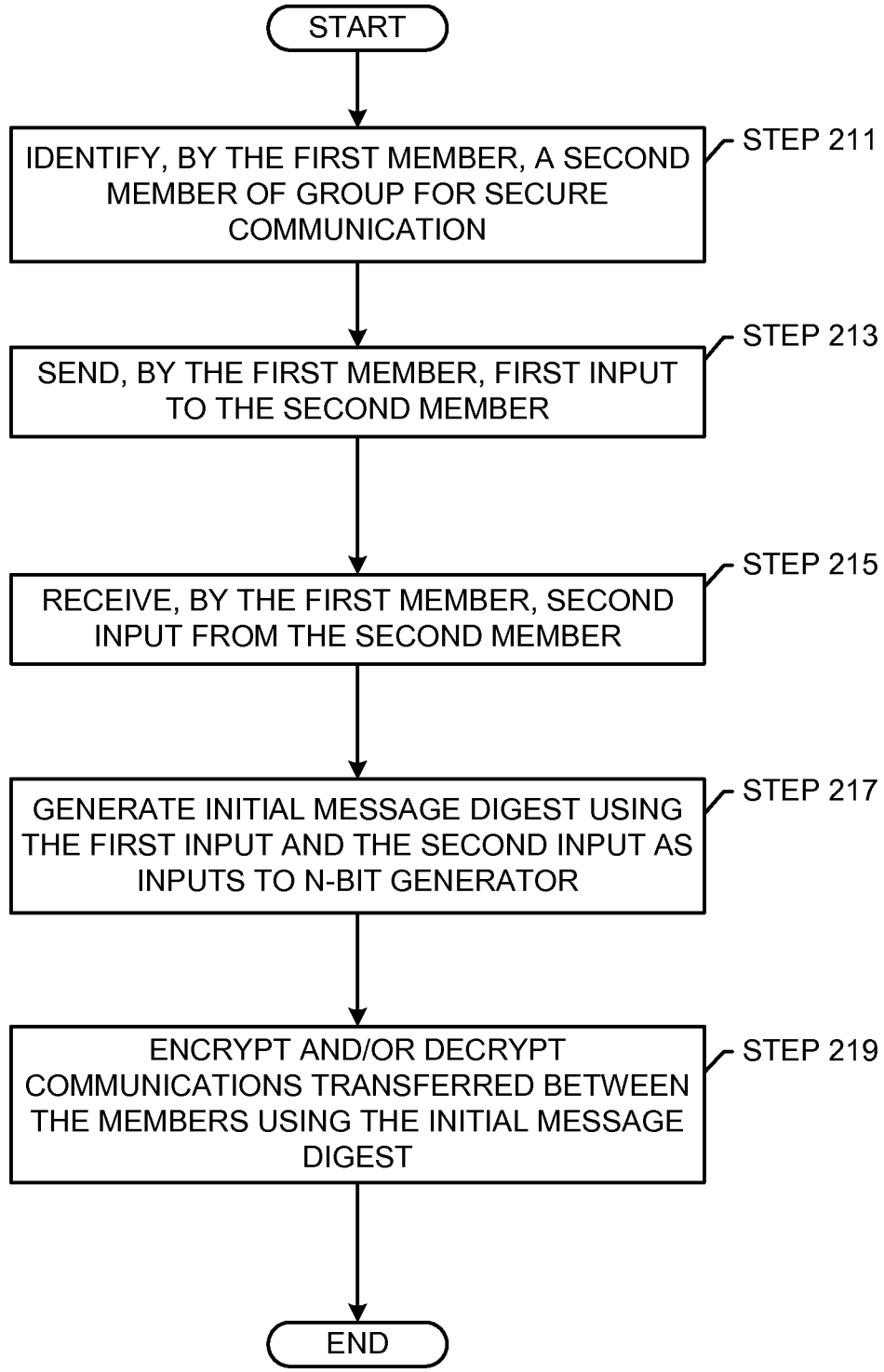

FIG. 3 shows a flowchart for generating an initial message digest by each member of the group providing input. In one or more embodiments of the invention, the members of the group do not have shared secrets prior to performing the flowchart discussed below. Although FIG. 3 is shown and discussed below from the prospective of one of the members of the group, the steps discussed below are performed by each member of the group so that all members generate the same initial message digest. Further, although FIG. 3 shows an example of a two member group, additional members may be added without departing from the scope of the invention.

In Step 211, a first member of the group identifies a second member of the group. Specifically, a member of the group commences communication with the group. Below are a few examples of how communication may be commenced amongst the members of the group.

In a first example, the security application executing on a first member may receive a request from a user to contact the second member of the group. The request may include a nickname if information about the second member is pre-initialized in the security application. Alternatively, the request may include the user of the second member's name, nickname, contact information, and/or secure communication channel information for communicating with the second member.

In another example, the first member's security application may receive a request for connection from the second member's security application based on a request of a user of the second member. In response, with or without input from the user of the first member, the first member's security application may initiate communication with the second member's security application.

In Step 213, the first member of the group sends a first input to the second member of the group. The first input may be a non-deterministic randomly generated challenge, a passphrase, or another piece of data. The first input may be provided with an identifier of the first member in accordance with one or more embodiments of the invention. Further, if the second member has a public key, the first member may obtain the public key from the public key repository and encrypt the first input with the public key. Alternatively, the first input may be sent in clear text. Although not shown in FIG. 3, the first member sends the same first input to each member of the group.

In Step 215, the first member of the group receives the second input from the second member. If the first member has a public key, then the second input may be in an encrypted format. The first member may decrypt the second input using the first member's private key.

In Step 217, an initial message digest is generated by the first member and the second member using the first input and the second input as inputs to the n-bit generator. Specifically, the encryption module calls the n-bit generator with the first input and the second input. Because both the first member and the second member each use the first input and the second input on the same instance of the n-bit generator, the resulting initial message digest is the same for the first member and the second member.

As discussed above, the steps discussed above may be performed by the security application with or without input from a user. For example, the encryption module of the security application may receive the second input and decrypt the second input autonomously. Thus, the encryption module may perform the aforementioned steps without notification or requiring input to/from a user.

In Step 219, communications between the members are encrypted and decrypted using the initial message digest. The communication may include, for example, files, entire messages, attachments, or any other data sent between the members of the group.

From the initial message digest, shared secrets may be extracted. The shared secrets may be stored in the secrets repository and used for many different types of communications. Rather than extracting the shared secrets for storage, the shared secrets may be extract for immediate use, such as for encrypting a file. For example, the static secret may be used to create encryption solutions to encrypt communications in a chat session, emails, files, or other types of communications. By way of another example, the dynamic secret may be used with or without the static secret when the dynamic secret remains unchanged between when the encryption key is created and the communication is decrypted (e.g., a chat session, emails, or other types of real-time or near real-time communications).

Figure 4:
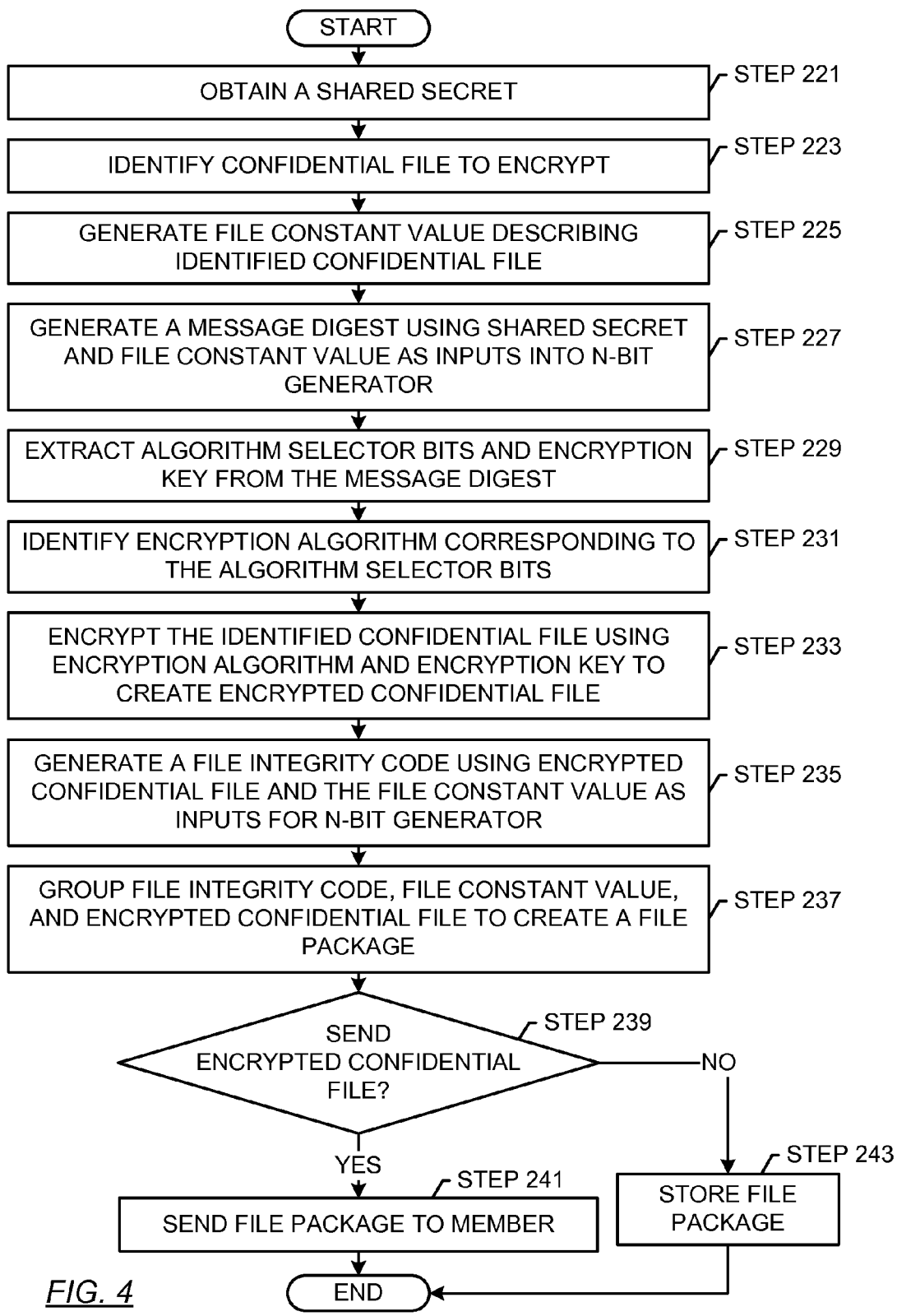

FIG. 4 shows a flowchart for encrypting a file in accordance with one or more embodiments of the invention. Specifically, in FIG. 4 an encryption key is generated and an encryption algorithm is selected for a specific file in accordance with one or more embodiments of the invention.

In Step 221, the member sending the file obtains a shared secret. Specifically, the member selects, from the secrets repository, the shared secret to encrypt the file. For example, the member may select the first secret, select a shared secret corresponding to the file format of the file, or a randomly selected shared secret.

In one or more embodiments of the invention, the shared secret may correspond to the static secret, the dynamic secret, or the static and dynamic secrets. Specifically, if a possibility exists that the file is not decrypted before the dynamic secret is changed, then the shared secret is only a static secret. Alternatively, the shared secret may also include a dynamic secret, for example, when the file is sent between members for decryption prior to any change of the dynamic secret (e.g., in a chat session or other such communication session).

Figure 6:
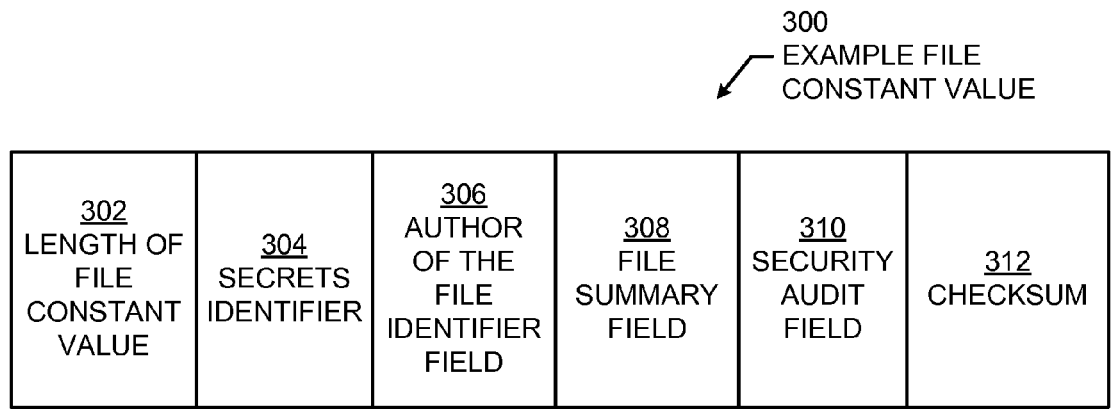
FIGS. 6-10 show example message digests in accordance with one or more embodiments of the invention.

In Step 223, the member identifies the file to communicate to the members. In Step 225, the member generates a file constant value describing the file. The file constant value is a string of bits that includes information to assist the members of the group to identify the shared secret and/or obtain information about the file without decrypting the file. In addition, the file constant value contains all information necessary for the receiving member to independently recreate the encryption solution and decrypt the file in accordance with one or more embodiments of the invention. FIG. 6, discussed below, provides an example of a file constant value.

Continuing with discussion of FIG. 4, a message digest is generated using the shared secret and the file constant value as inputs into the n-bit generator in Step 227. Specifically, the encryption module may call the n-bit generator using the shared secret and the file constant value as inputs. The n-bit generator combines the inputs and performs the hash to generate the message digest in accordance with one or more embodiments of the invention.

In Step 229, algorithm selector bits and an encryption key are extracted from the message digest in accordance with one or more embodiments of the invention. Specifically, the bits in the bit positions corresponding to the algorithm selector are extracted from the message digest. Similarly, the bits in the bit positions corresponding to the encryption key are extracted from the message digest.

In Step 231, the encryption algorithm corresponding to the algorithm selector bits are identified. In one or more embodiments of the invention, identifying the encryption algorithm includes obtaining the numeric format of the algorithm selector bits and using the numeric format to identify a matching encryption algorithm identifier in the algorithm selector table. The encryption algorithm associated with the matching algorithm identifier is selected.

In Step 233, the identified file is encrypted using the encryption algorithm and the encryption key to create an encrypted file. Specifically, the encryption module applies the encryption algorithm to the file using the encryption key.

In Step 235, a file integrity code may be generated using the encrypted file and the file constant value as inputs to the n-bit generator. Specifically, the n-bit generator generates a message digest using the encrypted file and the file constant value. The generated message digest is a file integrity code and may be used, for example, by the receiver to determine whether the file constant value and/or the encrypted file was unintentionally or maliciously modified.

In Step 237, the file integrity code, the encrypted file, and the file constant value are grouped to create a file package. The grouping may include combining the file integrity code, the encrypted file, and the file constant value into a single message, a virtual container, a folder, a single file, associated with a file group identifier, or another grouping mechanism.

In one or more embodiments of the invention, in Step 239, a determination is made whether to send the encrypted file or store it. If a determination is made to send the file, then the file package is sent to other member(s) of the group (241). If a determination is made to store the file, the file is stored (243). For example, the file package may be stored in a shared location such as a ftp and/or sent in one or more messages.

In order to decrypt the file, the members of the group may extract the secrets identifier from the constant value. Next, the members use the secrets identifier to search the secrets repository for the shared secret associated with the secrets identifier. As discussed above, each member has a copy of the shared secrets of the group. Thus, the members used the copy of the shared secret(s) identified by the secrets identifier and the received file constant value to perform Steps 227-231 to obtain the encryption algorithm and the encryption key. Because the instances of the n-bit generator on each of the members performs the same operations and each member uses copies of the same shared secret, the members generate the same message digest in Step 227. From the encryption algorithm and the encryption key, the members decrypt the file by applying the encryption algorithm and the encryption key to the file.

Alternatively, or additionally, a determination may be made in Step 239 to store the file. In Step 243, the file package is stored in accordance with one or more embodiments of the invention. For example, the file package may be stored on the member, on a computer system directly connected to the member, on a remote storage device, or in another location.

Although FIG. 4 discusses using a single message digest having the encryption algorithm selector bits and the encryption key, the aforementioned components may span multiple message digests.

Figure 5B:
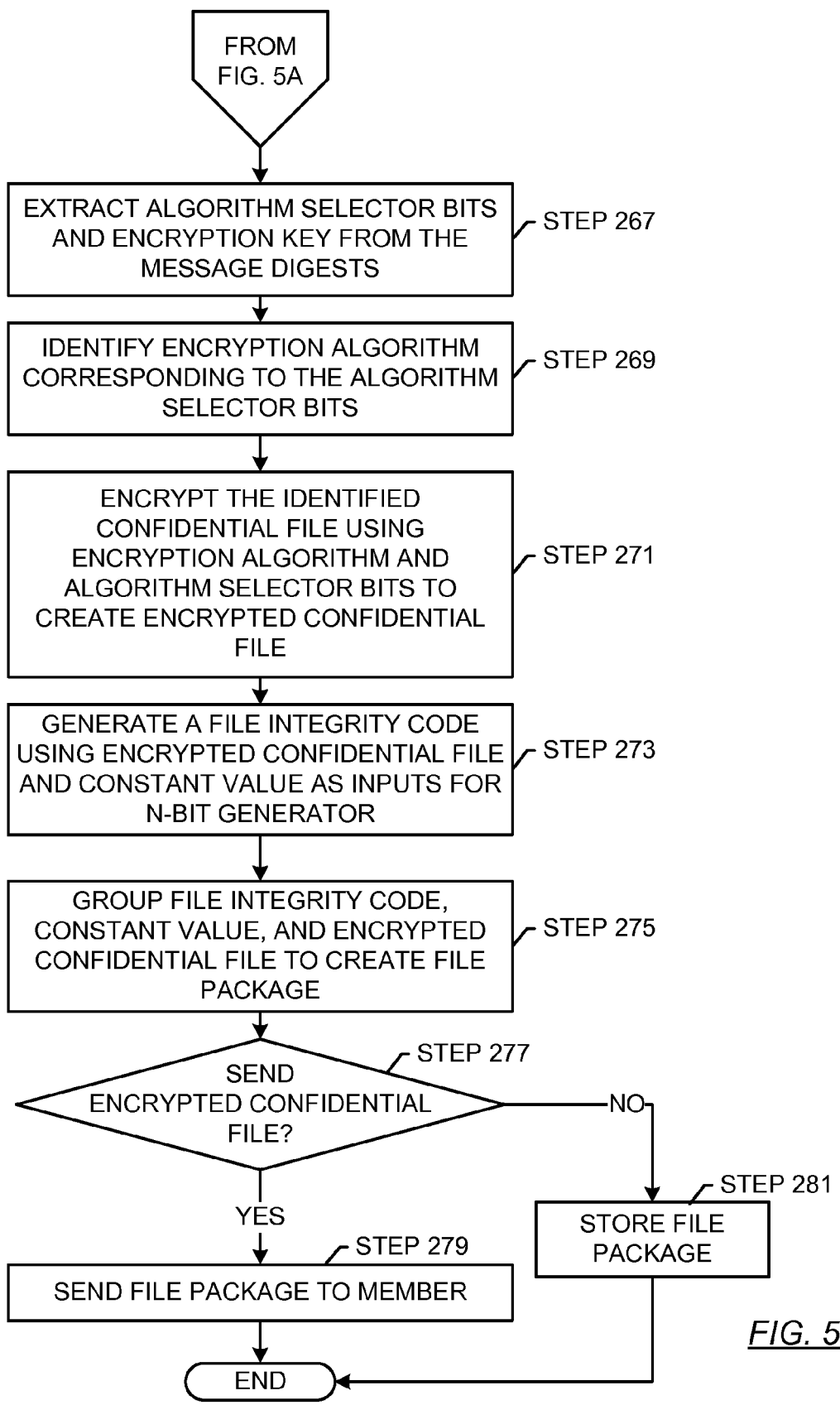

FIGS. 5A and 5B show flowcharts for generating an encryption solution from multiple message digests and using the encryption solution to encrypt a file in accordance with one or more embodiments of the invention.

In Step 251 of FIG. 5A, the member sending the file obtains the shared secret. Obtaining the shared secret may be performed as discussed above with reference to Step 221. Further, the member identifies the file to communicate to the members in Step 253.

In Step 255, the member generates a file constant value describing the file. Generating the file constant value may be performed as discussed above with reference to Step 225.

In Step 257, a message digest is generated using the shared secret and the file constant value as inputs to the n-bit generator. Generating the message digest may be performed as discussed above with reference to Step 227.

In Step 259, the change value and other components are extracted from the message digest. Extracting the components may include the encryption module identifying the bit positions corresponding to each of the components and separately storing the series of bits in the identified bit positions as the corresponding components. The other components that are extracted may include, for example, the most significant bits of the encryption key, the least significant bits of the encryption key, the algorithm selector bits, and/or other components present in a message digest.

In Step 261, a determination is made whether to create another message digest. In one or more embodiments of the invention, each security application is configured to create an identical number of message digests. Additional message digests may be generated to create additional bits for an encryption key and/or create additional components.

In Step 263, another message digest is generated using the change value, the shared secret, and the file constant value extracted from the previously generated message digest as inputs to the n-bit generator. Step 263 may be performed, for example, as discussed above with reference to Step 257.

In Step 265, the change value and other components are extracted from the third message digest in accordance with one or more embodiments of the invention. Extracting the change value and the other components may be performed as discussed above with reference to Step 259.

In Step 261, a determination is made whether to create another message digest. If a determination is made to create an additional message digest, then the steps repeat starting with Step 263. In Step 263, the change value extracted in Step 265 is used to generate a new message digest.

If a determination is made to not create another message digest, then the generated message digests may be used to encrypt the file. FIG. 5B shows a flowchart for encrypting the file using the generated message digests.

In Step 267 in FIG. 5B, algorithm selector bits and an encryption key are extracted from the message digest in accordance with one or more embodiments of the invention.

Specifically, the bits in the bit positions corresponding to the algorithm selector are extracted from the message digest. Similarly, the bits in the bit positions corresponding to the encryption key are extracted from the message digest.

In Step 269, the encryption algorithm corresponding to the algorithm selector bits are identified. In one or more embodiments of the invention, identifying the encryption algorithm includes obtaining the numeric format of the algorithm selector bits and using the numeric format to identify a matching encryption algorithm identifier in the algorithm selector table. The encryption algorithm associated with the matching algorithm identifier is selected.

In Step 271, the identified file is encrypted using the encryption algorithm and the encryption key to create an encrypted file. Specifically, the encryption module applies the encryption algorithm to the file using the encryption key.

In Step 273, a file integrity code may be generated using the encrypted file and the file constant value as inputs to the n-bit generator. Specifically, the n-bit generator generates a message digest using the encrypted file and the file constant value. The generated message digest is a file integrity code and may be used, for example, by the receiver to determine whether the file constant value and/or the encrypted file was unintentionally or maliciously modified.

In Step 275, the file integrity code, the encrypted file, and the file constant value are grouped to create a file package. The grouping may include combining the file integrity code, the encrypted file, and the file constant value into a single message, a virtual container, a folder, a single file, associated with a file group identifier, or another grouping mechanism.

In one or more embodiments of the invention, in Step 277, a determination is made whether to send the encrypted file. If a determination is made to send the file, then the file package is sent to other member(s) of the group in Step 279. For example, the file package may be stored in a shared location and/or sent in one or more messages.

In order to decrypt the file, the members of the group may extract the secrets identifier from the constant value. Next, the members use the secrets identifier to search the secrets repository for the shared secret associated with the secret identifier. As discussed above, each member has a copy of the secrets of the group. Thus, the members used the copy of the shared secret identified by the secrets identifier and the received file constant value to perform Steps 257-269 to obtain the encryption algorithm and the encryption key. Because the instances of the n-bit generator on each of the members performs the same operations and each member uses copies of the same shared secret, the members generate the same message digests. Further, in one or more embodiments of the invention, the members are similarly configured to generate the same number of message digests. For example, the number of message digests may in a configuration file for the group, part of the file constant value, and/or otherwise specified. Thus, the members have the same resulting message digests. From the encryption algorithm and the encryption key, the members decrypt the file by applying the encryption algorithm and the encryption key to the file.

Alternatively, or additionally, a determination may be made in Step 277 to store the file. In Step 281, the file package is stored in accordance with one or more embodiments of the invention. For example, the file package may be stored on the member, on a computer system directly connected to the member, on a remote storage device, a file transfer protocol (ftp) site, or in another location.

FIG. 6 shows an example file constant value in one or more embodiments of the invention. As shown in FIG. 6, the example file constant value (300) may include a length of the file constant value (302), a secrets identifier (304), an author of the file identifier (306), a file summary field (308), a security audit field (310), and a checksum (312).

The length of the file constant value (300) specifies the number of bits in the file constant value (300). The secrets identifier (304) is an identifier in the secrets repository of the secrets used by the member in Step 257 of FIG. 5A. In one or more embodiments of the invention, because each member associates the same secrets with the same identifier, the secrets identifier identifies the same secret(s).

The author of the file field (306) identifies the user that created the file in accordance with one or more embodiments of the invention. For example, the author may be one of the members. In one or more embodiments of the invention, the author of the file identifies the author of the clear-text file. Alternatively, the author of the file may identify the author of the resulting encrypted file. For example, the author of the file may identify the member performing the Steps of FIGS. 4 and 5A-5B.

In one or more embodiments of the invention, the file summary field (308) includes metadata about the file. For example, the file summary field may include the timestamps in which the file was created, accessed, and/or modified, the size of the file, and/or any other information about the file. By including the metadata, members of the group do not need to decrypt the file to obtain the metadata. Further, by including one or more timestamps in the metadata, a different encryption key may be generated for each file. For example, if the same file is encrypted five times in sequence, due to the delay in encrypting, each file would have a different time stamp and hence a different encryption key or encryption solution in accordance with one or more embodiments of the invention.

In one or more embodiments of the invention, the security audit field (310) provides security tracking information. The security audit field (310) may include information as to whether the user is following a security policy.

In one or more embodiments of the invention, the checksum (312) is a value used to determine whether the file constant value has been intentionally or unintentionally modified. For example, the checksum may be generated using a hash function on the file constant value. Alternatively, the checksum may corresponding be one of many error correcting checksums which would allow any modification to be reversed.

Although FIG. 6 shows a collection of components of the file constant value, some of the components of the file constant value may be omitted while additional components may be added to the file constant value without departing from the scope of the invention.

Figure 7:
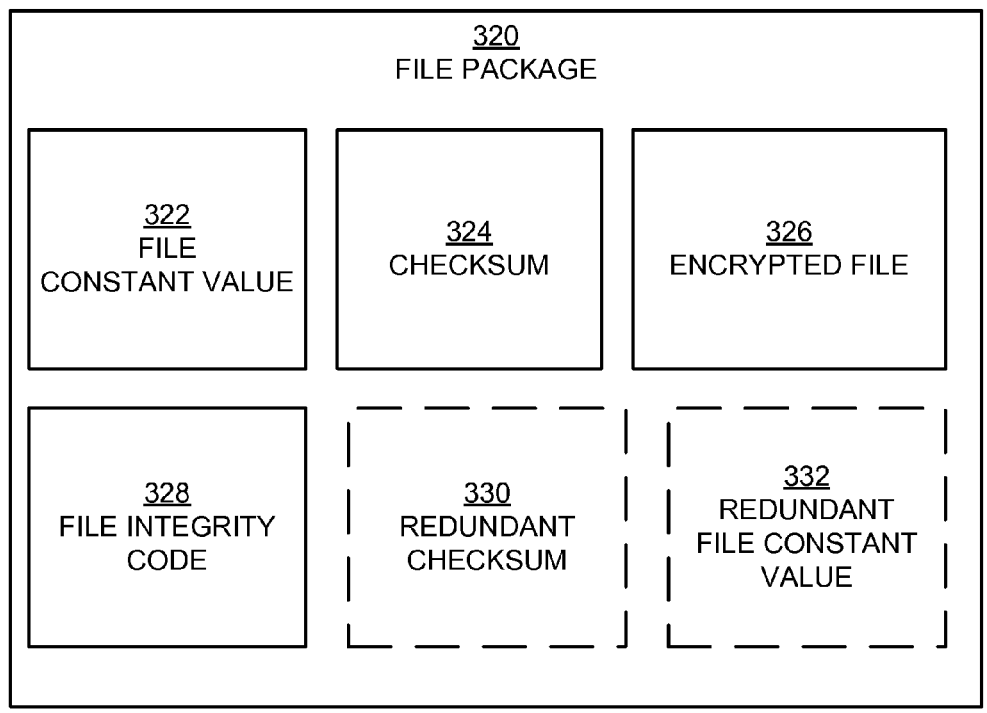

FIG. 7 shows an example file package in accordance with one or more embodiments of the invention. As shown in FIG. 7, the example file package (320) includes a file constant value (322), a checksum (324), an encrypted file (326), a file integrity code (328), a redundant checksum (330), and a redundant file constant value (332).

As discussed above, the file constant value (322) provides information about the encrypted file. For example, the file constant value may correspond to the example file in FIG. 6.

The checksum for the file (324) is a value used to determine whether the file is intentionally or unintentionally altered. For example, the checksum may be generated by applying a hash function to the file.

Continuing with the example file package (320), the file package includes the encrypted file (326). The encrypted file (326) may correspond to the file generated in FIGS. 4-5B (discussed above).

Further, the encrypted file package (320) may include a file integrity code (328). As discussed above, the file integrity code (328) allows a receiver of the encrypted file to determine whether the encrypted file or the file constant value were modified. Specifically, the receiver file package may generate a message digest using the encrypted file and the file constant value. If the receiver's generated message digest is identical to the file integrity code, then the receiver may conclude that neither the file constant value nor the encrypted file were modified.

After the receiver decrypts the encrypted file, the receiver may use the checksum (324) to determine whether the decrypted file includes errors. For example, the receiver may perform a hash function on the decrypted file to generate output. If the generated output is identical to the checksum (324), then the receiver may conclude that the decrypted file does not include errors. Alternatively, or additionally, a checksum may be used to determine whether the file package includes errors.

In one or more embodiments of the invention, the file package further includes a redundant checksum (330) and a redundant file constant value (332). The redundant checksum (330) may be compared with the checksum (324) to determine whether the checksum (324) and/or redundant checksum (330) has an error (e.g., missing or modified data). The comparison may be performed prior to, during, or after determining whether the decrypted file has an error using the checksum. Similarly, the redundant file constant value (332) may be compared with the file constant value (322) to determine whether the file constant value (322) and/or the redundant file constant value (332) has an error. If file constant value (322) has an error, the receiver may request that the creator of the encrypted file resend the file constant value in accordance with one or more embodiments of the invention. Alternately, the receiver may determine which file constant value (322) or (332) is accurate and thereafter use the accurate file constant value to generate a message digest as described in Step 257 of FIG. 5A above.

Figure 8:
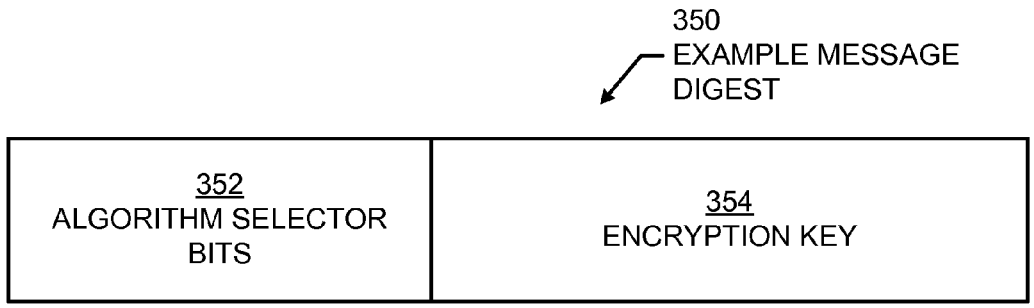

FIG. 8 shows an example message digest in accordance with one or more embodiments of the invention. As shown in FIG. 8, the message digest (350) may include algorithm selector bits (352) and an encryption key (354). In one or more embodiments of the invention, the algorithm selector bits (352) correspond to the series of bits that are in pre-defined bit positions in the message digest. In one or more embodiments of the invention, the bit position corresponding to the algorithm selector bits are known only to the security application. For example, the bit positions may be purposefully hidden from a user of the member.

As discussed above, the algorithm selector bits (352) correspond to the bit value of the encryption algorithm identifier in the algorithm selector table. In one or more embodiments of the invention, because each group has the same algorithm selector table, generates the same message digest, and uses the same bits in the message digest as the algorithm selector bits, the members of the group all know the algorithm for encrypting and decrypting the communication. Further, each time a message digest having algorithm selector bits is generated, the encryption algorithm may change from the previously generated encryption algorithm. Specifically, by including the algorithm selector bits in the message digest, not only may the encryption key change, but also the encryption algorithm. Thus, a nefarious user or computer system would have to match both the encryption algorithm with the encryption key with the communication to decrypted any encrypted communication.

The encryption key (354) is a key used by the encryption algorithm to encrypt and decrypt one or more communications. Because all members use the same instance of the n-bit generator to generate the message digests, the encryption key generated by each of the members is the same. Thus, the encryption key does not need to be communicated between the members. Moreover, the encryption key may be kept in the security application and not provided through any interface to any user. Thus, users that leave the group remain unaware of the encryption key used to encrypt the data.

Figure 9:
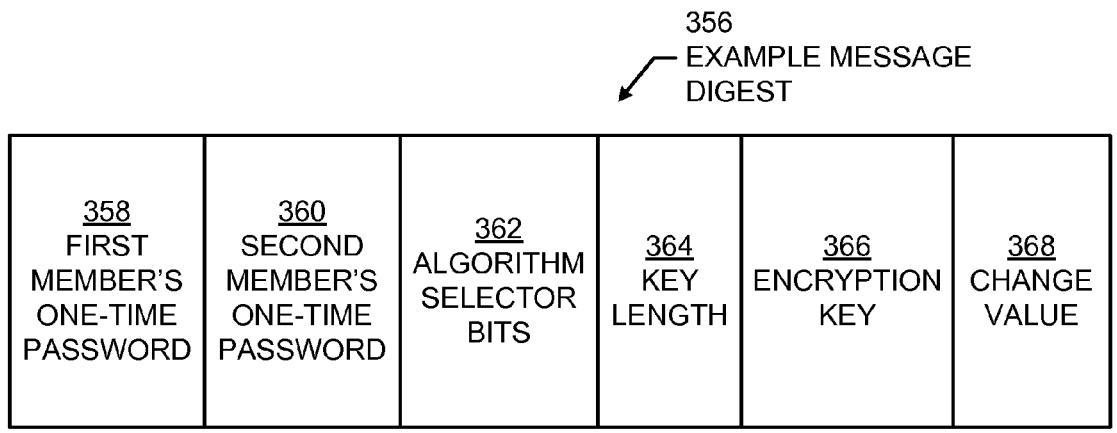

The message digest may include alternative or additional components. FIG. 9 shows an example message digest (356) in accordance with one or more embodiments of the invention. As shown in example FIG. 9, the message digest (356) may include a first member's one-time password (358), a second member's one-time password (360), algorithm selector bits (362), a key length (364), an encryption key (366), and a change value (368).

The first member's one-time password (358) is a series of bits generated by the n-bit generator for the second member to authenticate the first member. Specifically, because both the first member and the second member generate the same message digest (e.g., example message digest (356)), the first member's one-time password (358) is the same for the first member and the second member. Accordingly, if the first member's one-time password (358) that the first member sends to the second member is identical to the second member's generated first member's one time password, then the second member knows, with a high probability, that the first member is authentic. Specifically, the first member knows that the second member received the same input and had an n-bit generator that was capable of performing the same operations. Further, in one or more embodiments, once the first member and second member passwords have been confirmed, an extremely high probability exists that the other corresponding bits of the message digest also match between systems.

Similarly, the second member's one-time password (360) is a series of bits generated by the n-bit generator for the first member to authenticate the second member. Specifically, the second member sends the second member's one-time password (360) to the first member. If the second member's one-time password (360) that the second member sends to the first member is identical to the first member's generated second member's one-time password, then the first member knows, with a high probability, that the second member is authentic. Specifically, the second member knows that the first member received the same input and had an n-bit generator that was capable of performing the same operations and has the same message digest.

In one or more embodiments of the invention, prior to sending the one-time passwords, the one-time passwords are encrypted using an encryption algorithm and an encryption key. In such embodiments, the one-time passwords are sent encrypted. The receiver may encrypt their generated one-time password and compared the encrypted generated one-time password with the received encrypted one-time password. As an alternative, the receiver may decrypt the received encrypted one-time password and then compare the decrypted one-time password with the generated one-time password.

In one or more embodiments of the invention, one-time passwords (e.g., 358, 360) are sent between members after generating the message digest that includes the one-time passwords (e.g., 358, 360) and prior to sending any encrypted confidential information. Thus, members are authenticated prior to the sending and/or receiving of confidential information. In one or more embodiments of the invention, one-time passwords are only valid during a single communication session. For each new communication session, new one-time passwords are generated and subsequently used to authenticate the members. As an alternative, one-time passwords may only be used during a first communication session. Later communication sessions between members may not use one-time passwords. Additional one-time passwords may be generated to account for additional members of the group without departing from the scope of the invention. The additional one-time passwords may be generated, for example, by generating additional message digests.

Continuing with the example message digest in FIG. 9, the algorithm selector bits (362) may be similar to the algorithm selector bits (352) discussed above with reference to FIG. 8. As shown in FIG. 9, the algorithm selector bits (362) may be located in a different position.

The key length (364) specifies the size of the encryption key (366). Specifically, the key length (364) specifies the number of bits in the encryption key (366). In one or more embodiments of the invention, the encryption key (366) has at least a minimum size (e.g., 64 bit minimum, 128 bit minimum, etc.). Other embodiments of the invention, may use a fixed encryption key length. In such embodiments, the communication may be encrypted using only the components corresponding to the algorithm selector bits and the encryption key of the fixed length.

In one or more embodiments of the invention, a change value (368) provides a pseudo-random value to spawn a new message digest (356). For example, the change value may be used to create a new encryption key or create a new dynamic secret. Use of the change value is discussed above and in FIG. 5A-5B. Further, the stored secrets may be inputted to the n-bit generator to spawn temporary use secrets. All of the spawned secrets are used only during a session in accordance with one or more embodiments of the invention. After the session, the spawned secrets are destroyed so as to be no longer accessible or otherwise obtainable through any nefarious methods. Similar to the temporary use secrets, the change value is destroyed once combined with the appropriate dynamic secret.

Returning to the example message digest (356), FIG. 9 is only one example of the components of a message digest. Some of the components may be removed while other components may be added. For example, the message digest may include discard bits. Discard bits are bits that are ignored. As another example, rather than having the entire encryption key, the message digest may include only the most significant bits or the least significant bits of the encryption key. Another message digest may be generated and include the remaining bits.

Figure 10:
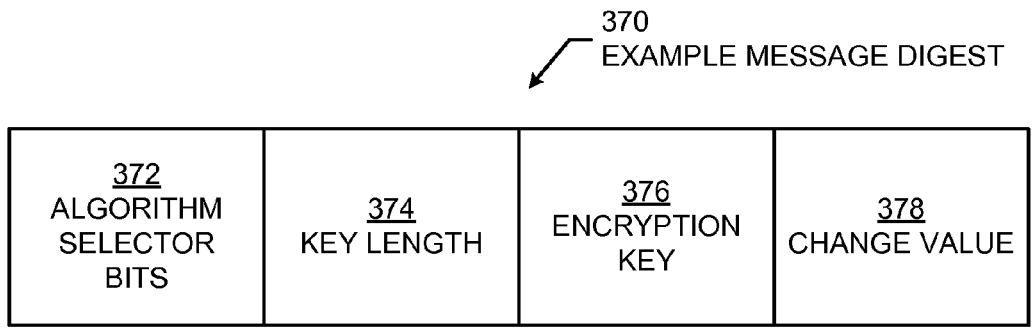

FIG. 10 shows another example of a message digest (370) in accordance with one or more embodiments of the invention. As shown in the example in FIG. 10, a message digest (370) may include only algorithm selector bits (372), a key length (374), an encryption key (376), and a change value (378). Although example FIG. 10 shows the ordering of the components of the message digest (370) as the same as in example FIG. 9, the ordering of the components may vary between message digests. For example, the encryption key may be the entire message digest, the first m-bits of the message digest, the middle m-bits of the message digest, etc. Further, each security application is similarly configured to extract the same set of bits for each of the components. For example, both the member A's security application and member B's security application may be configured to extract bits starting in position 56 and ending in position 184 as the encryption key.

The following is an example in accordance with one or more embodiments of the invention. The following example is for illustration purposes only and not intended to limit the scope of the invention. In the following example, consider the scenario in which a group has three members: Bob's computing device (computing device B), Joe's computing device (computing device J), and Sarah's computing device (computing device S).

With the first communication, security application on computing device B, security application on computing device J, and security application on computing device S each create a challenge. For example, computing device B's challenge is "454Bear", computing device J's challenge is "myTower", and computing device S's challenge is "d68saf." Further, each member accesses a certificate authority to obtain the public key of each other member. Computing device B's security application encrypts "454Bear" using computing device J's public key and sends the resulting encrypted challenge to computing device J's security application. Similarly, computing device B's security application encrypts "454Bear" using computing device S's public key and sends the resulting encrypted challenge to computing device S's security application. Computing device J's security application and computing device S's security application similarly encrypt their challenges using the other members' public keys and send their challenges.

After receiving the challenge, computing device B's security application, computing device J's security application, and computing device S's security application decrypt each of the challenges using their corresponding private keys. Computing device B's security application, computing device J's security application, and computing device S's security application each input "454Bear," "myTower," and "d68saf" into their respective n-bit generators to obtain a message digest. Because the n-bit generator provides a deterministic, pseudo-random result, the resulting message digest is the same for computing device B, computing device J, and computing device S. Accordingly, computing device B's security application, computing device J's security application, and computing device S's security application may use the message digest to populate a secrets repository, create encryption keys, and encrypt and decrypt the communications sent between them.

For example, computing device B's security application may send a file to computing device S's security application and computing device J's security application by creating an encryption key and identifying an encryption algorithm using the message digest, encrypting the file with the encryption key using the identified encryption algorithm, and sending the encrypted file. Computing device S's security application and computing device J's security application, who also have the same message digest can create the same encryption key, identify the correct encryption algorithm, and decrypt the file. A nefarious computer system, which is not capable of generating the message digest is unable to even create the encryption key. Moreover, because computing device B's security application, computing device S's security application, and computing device J's security application may continually change the encryption key and the encryption algorithm by generating new pseudo-random message digests, the nefarious computer system may be unlikely to identify the correct encryption key and the correct encryption algorithm for the correct message.

Figure 11:
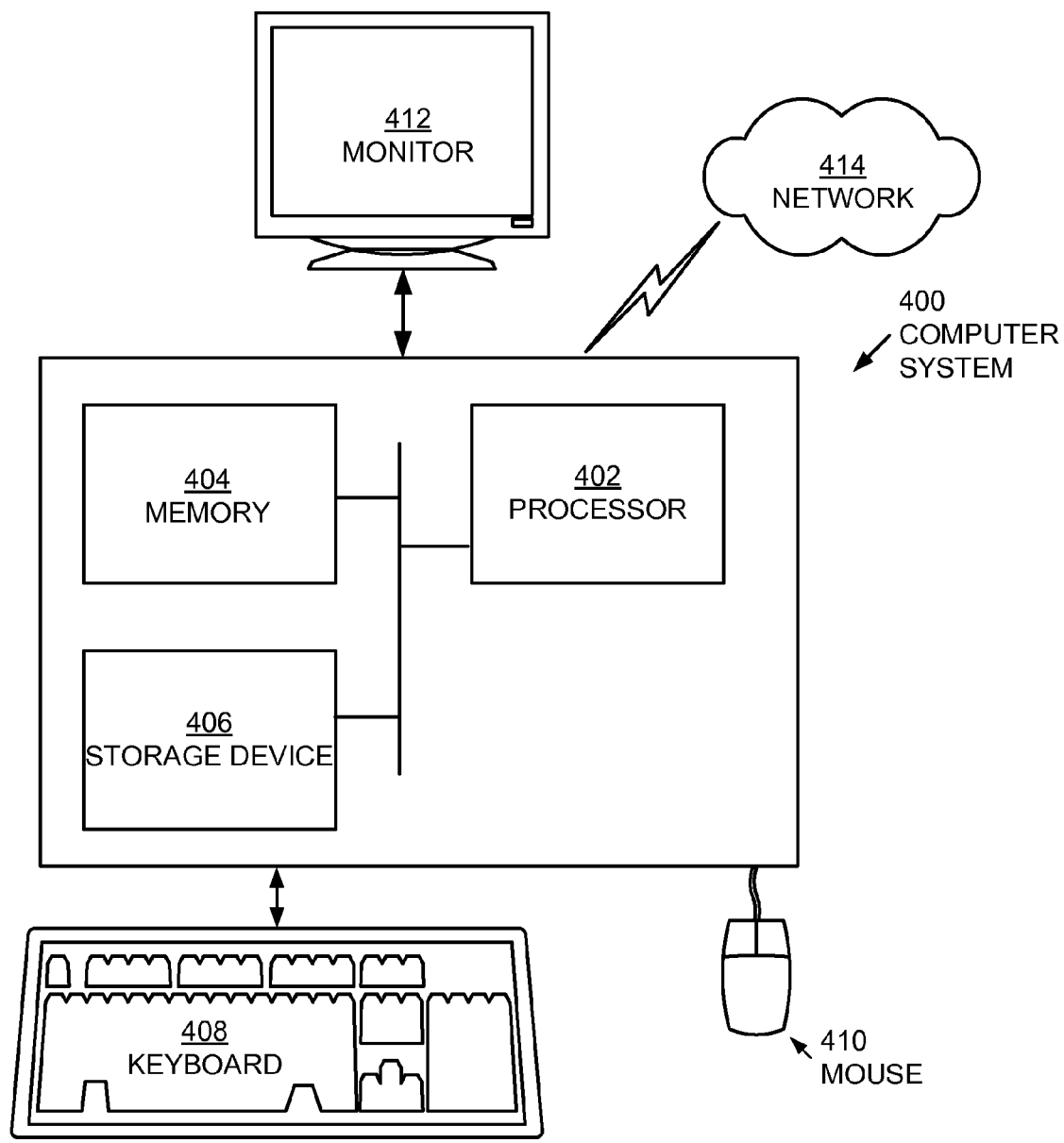
FIG. 11 shows a computer system in accordance with one or more embodiments of the invention.

Embodiments of the invention may be implemented on virtually any type of computer system regardless of the platform being used. The computing device may be the computer system, execute on the computer system, be an external device of the computer system, etc. For example, as shown in FIG. 11, a computer system (400) includes one or more computing processor(s) (402), associated memory (404) (e.g., random access memory (RAM), cache memory, flash memory, etc.), an internal and/or an external storage device (406) (e.g., a hard disk, an optical drive such as a compact disk drive or digital video disk (DVD) drive, a flash memory stick, universal serial bus (USB) drive, smart card, smart phone, etc.), and numerous other elements and functionalities typical of today's computers (not shown). The computer system (400) may also include input means, such as a keyboard (408), a touch screen (412), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection wired or wireless (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Computer readable program code to perform embodiments of the invention may be stored on a computer readable medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for securing communication between a plurality of members, wherein a computing device performs acts comprising:
   obtaining a group agreed seed known to each member of a group;
   generating, by an n-bit generator, at least one initial message digest using the group agreed seed;
   extracting a plurality of secrets from the at least one initial message digest, wherein each of the plurality of secrets comprises a different selection of bits extracted from the at least one initial message digest;
   assigning, for each communication mode of a plurality of communication modes, a unique subset of the plurality of secrets with the communication mode;
   identifying, by a first member of the group, a communication mode for a first communication to a second member of the group;
   selecting, by the first member, a first secret from the unique subset of the plurality of secrets corresponding to the communication mode for the first communication;
   generating, by the n-bit generator executing on the first member, a first message digest using the first secret;
   extracting, by the first member, first algorithm selector bits from the first message digest;
   selecting, by the first member, a first encryption algorithm identified in an algorithm selector table by the first algorithm selector bits;
   obtaining, from the algorithm selector table, a starting bit identifier, wherein the starting bit identifier is identified by the first algorithm selector bits;
   extracting, by the first member, a first encryption key from the first message digest by selecting a number of bits starting at a starting bit identified by the starting bit identifier;
   encrypting, by the first member, the first communication using the first encryption algorithm and the first encryption key to obtain a first encrypted communication; and
   sending, by the first member to the second member via the communication mode for the first communication, the first encrypted communication.

2. The method of claim 1, wherein generating the first message digest comprises using a second secret.

3. The method of claim 1, further comprising:
   generating, by the n-bit generator, a second message digest using the first secret, a second secret, and a change value, wherein the second secret is obtained from the unique subset of the plurality of secrets corresponding to the communication mode for the first communication;
   extracting, by the first member, second algorithm selector bits and a second encryption key from the second message digest;
   selecting, by the first member, a second encryption algorithm identified by the second algorithm selector bits;
   encrypting, by the first member, a second communication using the second encryption algorithm and the second encryption key to obtain a second encrypted communication; and
   sending, by the first member to the second member, the second encrypted communication.

4. The method of claim 3, wherein the first encrypted communication and the second encrypted communication are sent during a single communication session.

5. The method of claim 1, further comprising:
   combining a change value with an intermediate result of generating the first message digest to create an interim dynamic secret;
   using the interim dynamic secret to generate a second message digest;
   extracting, by the first member, second algorithm selector bits and a second encryption key from the second message digest;
   selecting, by the first member, a second encryption algorithm identified by the second algorithm selector bits;
   encrypting, by the first member, a second communication using the second encryption algorithm and the second encryption key to obtain a second encrypted communication; and
   sending, by the first member to the second member, the second encrypted communication.

6. The method of claim 1, further comprising:
   receiving, by the first member from the second member, a second encrypted communication;
   obtaining a second secret, wherein the second secret is obtained from the unique subset of the plurality of secrets corresponding to the communication mode of the second encrypted communication, wherein the communication mode for the first communication is different than the communication mode of the second encrypted communication;

generating, by the n-bit generator executing on the first member, a second message digest using the second secret;

extracting second algorithm selector bits and a second encryption key from the second message digest;

selecting a second encryption algorithm identified by the second algorithm selector bits; and decrypting the second encrypted communication using the second encryption algorithm and the second encryption key to obtain a second communication.

7. The method of claim 1, further comprising:

generating, by the first member, a file constant value describing a file, wherein the file constant value comprises an identifier of the first secret, wherein the first message digest is further generated using the file constant value, wherein encrypting the first communication comprises encrypting the file to obtain an encrypted file, and wherein sending the first encrypted communication comprises sending a file package comprising the file constant value and the encrypted file.

8. The method of claim 7, further comprising:

generating, by the n-bit generator, a file integrity code using the encrypted file and the file constant value, wherein the file package further comprises the file integrity code.

9. A computing device comprising:

a computer processor;

a non-transitory computer-readable memory; and software instructions stored in the non-transitory computer-readable memory that, when executed by the computer processor, causes the computer processor to perform operations comprising:

obtain a group agreed seed known to each member of a group;

generate, by an n-bit generator, at least one initial message digest using the group agreed seed;

extract a plurality of secrets from the at least one initial message digest, wherein each of the plurality of secrets comprises a different selection of bits extracted from the at least one initial message digest;

assign, for each communication mode of a plurality of communication modes, a unique subset of the plurality of secrets with the communication mode;

identify, by a first member of the group, a communication mode for a first communication to a second member of the group;

select, by the first member, a first secret from the unique subset of the plurality of secrets corresponding to the communication mode for the first communication, wherein the computing device is the first member;

generate, by the n-bit generator executing on the first member, a first message digest using the first secret;

extract first algorithm selector bits from the first message digest;

select a first encryption algorithm identified in an algorithm selector table by the first algorithm selector bits;

obtain, from the algorithm selector table, a starting bit identifier, wherein the starting bit identifier is identified by the first algorithm selector bits;

extract, by the first member, a first encryption key from the first message digest by selecting a number of bits starting at a starting bit identified by the starting bit identifier;

encrypt the first communication using the first encryption algorithm and the first encryption key to obtain a first encrypted communication; and send, to the second member, the first encrypted communication via the communication mode for the first communication.

10. The computing device of claim 9, wherein generating the first message digest comprises using a second secret.

11. The computing device of claim 9, wherein the software instructions further cause the computing device to:

generate, by the n-bit generator, a second message digest using the first secret, a second secret, and a change value, wherein the second secret is obtained from the unique subset of the plurality of secrets corresponding to the communication mode for the first communication;

extract second algorithm selector bits and a second encryption key from the second message digest;

select a second encryption algorithm identified by the second algorithm selector bits;

encrypt a second communication using the second encryption algorithm and the second encryption key to obtain a second encrypted communication; and send, to the second member, the second encrypted communication.

12. The computing device of claim 11, wherein the first encrypted communication and the second encrypted communication are sent during a single communication session.

13. The computing device of claim 9, further comprising:

combining a change value with an intermediate result of generating the first message digest to create an interim dynamic secret;

using the interim dynamic secret to generate a second message digest;

extracting, by the first member, second algorithm selector bits and a second encryption key from the second message digest;

selecting, by the first member, a second encryption algorithm identified by the second algorithm selector bits;

encrypting, by the first member, a second communication using the second encryption algorithm and the second encryption key to obtain a second encrypted communication; and sending, by the first member to the second member, the second encrypted communication.

14. The computing device of claim 9, wherein the software instructions further cause the computing device to:

receive, from the second member, a second encrypted communication;

obtain a second secret, wherein the second secret is obtained from the unique subset of the plurality of secrets corresponding to the communication mode of the second encrypted communication, wherein the communication mode for the first communication is different than the communication mode of the second encrypted communication;

generate, by the n-bit generator executing on the first member, a second message digest using the second secret;

extract second algorithm selector bits and a second encryption key from the second message digest;

select a second encryption algorithm identified by the second algorithm selector bits; and decrypt the second encrypted communication using the second encryption algorithm and the second encryption key to obtain a second communication.

15. The computing device of claim 9, wherein the software instructions further cause the computing device to:
generate a file constant value describing a file,
wherein the file constant value comprises an identifier of the first secret,
wherein the first message digest is further generated using the file constant value,
wherein encrypting the first communication comprises encrypting the file to obtain an encrypted file, and
wherein sending the first encrypted communication comprises sending a file package comprising the file constant value and the encrypted file.

16. The computing device of claim 15, wherein the software instructions further cause the computing device to:
generate, by the n-bit generator, a file integrity code using the encrypted file and the file constant value,
wherein the file package further comprises the file integrity code.

17. A non-transitory computer readable medium comprising computer readable program code embodied therein that, when executed by one or more computer processors, cause the one or more computer processors to perform a method for securing communication between a plurality of members, the method comprising:
obtaining a group agreed seed known to each member of a group;
generating, by an n-bit generator, at least one initial message digest using the group agreed seed;
extracting a plurality of secrets from the at least one initial message digest, wherein each of the plurality of secrets comprises a different selection of bits extracted from the at least one initial message digest;
assigning, for each communication mode of a plurality of communication modes, a unique subset of the plurality of secrets with the communication mode;
identifying, by a first member of the group, a communication mode for a first communication to a second member of the group;
selecting, by the first member, a first secret from the unique subset of the plurality of secrets corresponding to the communication mode for the first communication;
generating, by the n-bit generator executing on the first member, a first message digest using the first secret;
extracting, by the first member, first algorithm selector bits from the first message digest;
selecting, by the first member, a first encryption algorithm identified in an algorithm selector table by the first algorithm selector bits;
obtaining, from the algorithm selector table, a starting bit identifier, wherein the starting bit identifier is identified by the first algorithm selector bits;
extracting, by the first member, a first encryption key from the first message digest by selecting a number of bits starting at a starting bit identified by the starting bit identifier;
encrypting, by the first member, the first communication using the first encryption algorithm and the first encryption key to obtain a first encrypted communication; and
sending, by the first member to the second member of the group via the communication mode for the first communication, the first encrypted communication.

18. The non-transitory computer readable medium of claim 17, wherein generating the first message digest comprises using a second secret.

19. The non-transitory computer readable medium of claim 17, wherein the method further comprises:
generating, by the n-bit generator, a second message digest using the first secret, a second secret, and a change value, wherein the second secret is obtained from the unique subset of the plurality of secrets corresponding to the communication mode for the first communication;
extracting, by the first member, second algorithm selector bits and a second encryption key from the second message digest;
selecting, by the first member, a second encryption algorithm identified by the second algorithm selector bits;
encrypting, by the first member, a second communication using the second encryption algorithm and the second encryption key to obtain a second encrypted communication; and
sending, by the first member to the second member, the second encrypted communication.

20. The non-transitory computer readable medium of claim 19, wherein the first encrypted communication and the second encrypted communication are sent during a single communication session.

21. The non-transitory computer readable medium of claim 17, further comprising:
combining a change value with an intermediate result of generating the first message digest to create an interim dynamic secret;
using the interim dynamic secret to generate a second message digest;
extracting, by the first member, second algorithm selector bits and a second encryption key from the second message digest;
selecting, by the first member, a second encryption algorithm identified by the second algorithm selector bits;
encrypting, by the first member, a second communication using the second encryption algorithm and the second encryption key to obtain a second encrypted communication; and
sending, by the first member to the second member, the second encrypted communication.

22. The non-transitory computer readable medium of claim 17, wherein the method further comprises:
receiving, by the first member from the second member, a second encrypted communication;
obtaining a second secret, wherein the second secret is obtained from the unique subset of the plurality of secrets corresponding to the communication mode of the second encrypted communication, wherein the communication mode for the first communication is different than the communication mode of the second encrypted communication;
generating, by the n-bit generator executing on the first member, a second message digest using the second secret;
extracting second algorithm selector bits and a second encryption key from the second message digest;
selecting a second encryption algorithm identified by the second algorithm selector bits; and
decrypting the second encrypted communication using the second encryption algorithm and the second encryption key to obtain a second communication.

23. The non-transitory computer readable medium of claim 17, wherein the method further comprises:
generating, by the first member, a file constant value describing a file,
wherein the file constant value comprises an identifier of the first secret, wherein the first message digest is further generated using the file constant value, wherein encrypting the first communication comprises encrypting the file to obtain an encrypted file, and wherein sending the first encrypted communication comprises sending a file package comprising the file constant value and the encrypted file.

24. The non-transitory computer readable medium of claim 23, wherein the method further comprises:

generating, by the n-bit generator, a file integrity code using the encrypted file and the file constant value, wherein the file package further comprises the file integrity code.

* * * * *